US008977732B2

(12) United States Patent
Fukushima

(10) Patent No.: US 8,977,732 B2
(45) Date of Patent: Mar. 10, 2015

(54) SERVICE USAGE TERMINAL, SERVICE PROVIDING TERMINAL, CONTROL METHOD OF SERVICE PROVIDING TERMINAL, CONTROL METHOD OF SERVICE PROVIDING TERMINAL AND SERVICE PROVIDING SYSTEM

(75) Inventor: Keito Fukushima, Tokyo (JP)

(73) Assignee: Olympus Corporation, Tokyo (JP)

( * ) Notice: Subject to any disclaimer, the term of this patent is extended or adjusted under 35 U.S.C. 154(b) by 914 days.

(21) Appl. No.: 13/085,825

(22) Filed: Apr. 13, 2011

(65) Prior Publication Data
US 2011/0258304 A1 Oct. 20, 2011

(30) Foreign Application Priority Data
Apr. 14, 2010 (JP) .................. 2010-093545

(51) Int. Cl.
*G06F 15/173* (2006.01)
*H04L 29/08* (2006.01)
(52) U.S. Cl.
CPC ...................... *H04L 67/14* (2013.01)
USPC ....................................... 709/223
(58) Field of Classification Search
CPC . G06F 13/4027; G06F 13/405; G06F 13/105; H04N 1/00278; H04N 1/0035; H04L 67/14
USPC .......................... 710/110; 709/223
See application file for complete search history.

(56) References Cited

U.S. PATENT DOCUMENTS

| | | | | |
|---|---|---|---|---|
| 5,533,204 A * | 7/1996 | Tipley | ............. | 710/108 |
| 5,887,194 A * | 3/1999 | Carson et al. | ............. | 710/36 |
| 6,240,477 B1 * | 5/2001 | Erkinger et al. | ............. | 710/110 |
| 6,266,731 B1 * | 7/2001 | Riley et al. | ............. | 710/313 |
| 6,557,068 B2 * | 4/2003 | Riley et al. | ............. | 710/306 |
| 6,816,934 B2 * | 11/2004 | Riley et al. | ............. | 710/113 |
| 7,099,986 B2 * | 8/2006 | Pettey et al. | ............. | 710/314 |
| 7,219,151 B2 * | 5/2007 | Kobayashi et al. | ............. | 709/225 |
| 7,464,207 B2 * | 12/2008 | Riley et al. | ............. | 710/113 |

(Continued)

FOREIGN PATENT DOCUMENTS

| | | |
|---|---|---|
| JP | 2008-294970 A | 12/2008 |
| WO | 2006/080330 A1 | 8/2006 |

OTHER PUBLICATIONS

"Universal Serial Bus Revision 2.0 specification", Apr. 27, 2010, (http://www.usb.org/developers/docs/).

(Continued)

*Primary Examiner* — Philip Chea
*Assistant Examiner* — Marcus McKenzie
(74) *Attorney, Agent, or Firm* — Westerman, Hattori, Daniels & Adrian, LLP

(57) ABSTRACT

A communication control section according to the invention receives communication data on a transport layer from a service providing terminal which provides service in a higher layer than the transport layer, and a CPU performs a stopping process of a session layer relating to the service, when the communication data on the transport layer which is received by the communication control section relates to a stop request of the service. The CPU receives a trigger relating to the stop of the service, and the communication control section transmits the communication data on the transport layer including a request to the higher layer relating to the stop request of the service, to the service providing terminal, when the CPU receives the trigger.

13 Claims, 14 Drawing Sheets

(56) References Cited

U.S. PATENT DOCUMENTS

| | | | |
|---|---|---|---|
| 7,561,288 B2* | 7/2009 | Yano et al. | 358/1.15 |
| 7,587,542 B2* | 9/2009 | Riley et al. | 710/113 |
| 7,725,559 B2* | 5/2010 | Landis et al. | 709/215 |
| 7,787,391 B2* | 8/2010 | Sakai et al. | 370/252 |
| 7,852,503 B2* | 12/2010 | Iwami et al. | 358/1.15 |
| 8,035,832 B2* | 10/2011 | Yamada et al. | 358/1.15 |
| 8,072,640 B2* | 12/2011 | Yano et al. | 358/1.15 |
| 8,085,413 B2* | 12/2011 | Yamada et al. | 358/1.13 |
| 8,117,314 B2* | 2/2012 | Croft et al. | 709/227 |
| 8,117,318 B2* | 2/2012 | Odakura | 709/227 |
| 8,228,529 B2* | 7/2012 | Yamada et al. | 358/1.15 |
| 2002/0073258 A1* | 6/2002 | Riley et al. | 710/105 |
| 2002/0108122 A1* | 8/2002 | Alao et al. | 725/117 |
| 2003/0105978 A1* | 6/2003 | Byrne | 713/201 |
| 2003/0110246 A1* | 6/2003 | Byrne et al. | 709/223 |
| 2003/0225956 A1* | 12/2003 | Riley et al. | 710/309 |
| 2004/0046990 A1* | 3/2004 | Yano et al. | 358/1.15 |
| 2005/0033893 A1* | 2/2005 | Pettey et al. | 710/309 |
| 2005/0113025 A1* | 5/2005 | Akamatsu et al. | 455/41.3 |
| 2005/0141040 A1* | 6/2005 | Yamada et al. | 358/296 |
| 2006/0285155 A1* | 12/2006 | Yamada et al. | 358/1.15 |
| 2008/0126554 A1* | 5/2008 | Sakai et al. | 709/230 |
| 2008/0145058 A1* | 6/2008 | Fukae et al. | 398/118 |
| 2008/0189422 A1* | 8/2008 | Naoe et al. | 709/227 |
| 2008/0279560 A1* | 11/2008 | Osawa et al. | 398/130 |
| 2008/0291941 A1* | 11/2008 | Sakai et al. | 370/469 |
| 2009/0002730 A1* | 1/2009 | Yamada et al. | 358/1.9 |
| 2009/0161161 A1* | 6/2009 | Yano et al. | 358/1.15 |
| 2010/0262701 A1* | 10/2010 | Odakura | 709/228 |

OTHER PUBLICATIONS

"Universal Serial Bus Revision 2.0 specification", Apr. 27, 2000. (http://www.usb.org/developers/docs/).

Japanese Office Action dated Dec. 3, 2013, issued in corresponding Japanese Patent Application No. 2010-093545 with English Translation. (4 pages).

Takiuchi, "Comet server and Comet client", Web + DB Press, Japan, Gijutsu-Hyohron Co., Ltd., Nov. 25, 2007, vol. 41. pp. 97-102. with English translation; cited in the Japanese Office Action dated Dec. 3, 2013 (14 pages).

* cited by examiner

| Bit<br>Byte | 7 | 6 | 5 | 4 | 3 | 2 | 1 | 0 |
|---|---|---|---|---|---|---|---|---|
| 0 | Message Type ||||||||
| 1 | Message Code ||||||||
| 2~5 | Parameters ||||||||
| 6 | Length ||||||||
| 7 | ||||||||
| 8~n | Data ||||||||

| Bit<br>Byte | 7 | 6 | 5 | 4 | 3 | 2 | 1 | 0 |
|---|---|---|---|---|---|---|---|---|
| 0 | Message Type=0x00(Request Message) ||||||||
| 1 | Message Code=0x01(Get Service List) ||||||||
| 2 | Reserved ||||||||
| 3 | ||||||||
| 4 | ||||||||
| 5 | ||||||||
| 6 | Length=0 ||||||||
| 7 | ||||||||

FIG. 6

| Bit<br>Byte | 7 | 6 | 5 | 4 | 3 | 2 | 1 | 0 |
|---|---|---|---|---|---|---|---|---|
| 0 | colspan=8 | Message Type=0x01 (Response Message) |||||||
| 1 | colspan=8 | Message Code=0x01 (Get Service List) |||||||
| 2 | colspan=8 | Number of Service Parameter=m |||||||
| 3 | colspan=8 rowspan=3 | Reserved |||||||
| 4 | |||||||| 
| 5 | ||||||||
| 6 | colspan=8 rowspan=2 | Length = SIZE OF EIGHTH BYTE AND THEREAFTER ||||||||
| 7 | ||||||||
| 8~n | colspan=8 | Service Parameter#0 <br> : <br> Service Parameter#m-1 |||||||

FIG. 7

| Bit<br>Byte | 7 | 6 | 5 | 4 | 3 | 2 | 1 | 0 |
|---|---|---|---|---|---|---|---|---|
| 0 | colspan=8 | Protocol Code |||||||
| 1 | colspan=8 | Class Code |||||||
| 2 | colspan=8 | Result Code |||||||
| 3~5 | colspan=8 | Reserved |||||||
| 6~7 | colspan=8 | Length |||||||
| 8~n | colspan=8 | Service Information |||||||

FIG. 8

| Bit<br>Byte | 7 | 6 | 5 | 4 | 3 | 2 | 1 | 0 |
|---|---|---|---|---|---|---|---|---|
| 0 | colspan=8 Message Type=0x00 (Request Message) |||||||| 
| 1 | colspan=8 Message Code=0x02 (Set Service) ||||||||
| 2 | colspan=8 Reserved ||||||||
| 3 | colspan=8  ||||||||
| 4 | colspan=8  ||||||||
| 5 | colspan=8  ||||||||
| 6 | colspan=8 Length = SIZE OF SERVICE PARAMETER ||||||||
| 7 | colspan=8  ||||||||
| 8~n | colspan=8 Service Parameter ||||||||

FIG. 9

| Bit<br>Byte | 7 | 6 | 5 | 4 | 3 | 2 | 1 | 0 |
|---|---|---|---|---|---|---|---|---|
| 0 | colspan=8 Message Type=0x01 (Responce Message) ||||||||
| 1 | colspan=8 Message Code=0x02 (Set Service) ||||||||
| 2 | colspan=8 Result Code ||||||||
| 3 | colspan=8 Reserved ||||||||
| 4 | colspan=8  ||||||||
| 5 | colspan=8  ||||||||
| 6 | colspan=8 Length=0 ||||||||
| 7 | colspan=8  ||||||||

```
<?xml version="1.0" encoding="UTF-8"?>
<foo xmlns="http://www.foo.co.jp/schema/">
  <action>ServiceStop</action>
</foo>
```

FIG. 16

| Bit<br>Byte | 7 | 6 | 5 | 4 | 3 | 2 | 1 | 0 |
|---|---|---|---|---|---|---|---|---|
| 0 | colspan="8" | Operation Code:0xD0 |
| 1 | colspan="8" | Reserve |
| 2 | colspan="8" | Reserve |
| 3 | colspan="8" | Reserve |
| 4 | colspan="8" | Reserve |
| 5 | colspan="8" | Reserve |

FIG. 20

| Field | Description |
|---|---|
| Operation Code | ServiceStop (0x9000) |
| Parameter1 | OPERATION PARAMETER (NOT USED IN THIS OPERATION) |
| Parameter2 | |
| Parameter3 | |
| Parameter4 | |
| Parameter5 | |

SERVICE USAGE TERMINAL, SERVICE PROVIDING TERMINAL, CONTROL METHOD OF SERVICE PROVIDING TERMINAL, CONTROL METHOD OF SERVICE PROVIDING TERMINAL AND SERVICE PROVIDING SYSTEM

BACKGROUND OF THE INVENTION

1. Field of the Invention

The present invention relates to a service usage terminal, a service providing terminal, a control method of the service usage terminal, a control method of the service providing terminal, and a service providing system.

Priority is claimed on Japanese Patent Application No. 2010-93545, filed Apr. 14, 2010, the content of which is incorporated herein by reference.

2. Description of Related Art

The stop control of service in a client/server type application is performed by a client. In the client/server type application, when a master-slave type transport layer protocol which functions as initiator/responder or host/device is employed in a transport layer, if the responder/device is allocated to the server and the initiator/host is allocated to the client, it is possible to control stopping the service from the client and/or stopping the session layer protocol. Further, USB 2.0 is known as a communication standard (for example, Universal Serial Bus Specification Revision 2.0, [online], Apr. 27, 2000, [searched Mar. 25, 2010], Internet <URL: http://www.usb.org/developers/docs/>).

SUMMARY OF THE INVENTION

An advantage of some aspects of the invention is that it provides a service usage terminal, a service providing terminal, a control method of the service usage terminal, a control method of the service providing terminal, and a service providing system which can perform as stop control of the service and/or a session layer protocol at a client, when the transport layer in the client side functions as responder/device, in a client/server type application.

The invention adopts the following features in order to obtain the above-described aspects.

(1) According to an embodiment of the invention, a service usage terminal is provided including: a receiving section which receives communication data on a transport layer from a service providing terminal which provides service in a higher layer than the transport layer; a control section which performs a stopping process of a session layer protocol relating to the service, when the received communication data on the transport layer relates to a stop request of the service; a trigger receiving section which receives a trigger relating to the stop of the service; and a transmitting section which transmits the communication data on the transport layer including a request to the higher layer relating to the stop request of the service, to the service providing terminal, when the trigger is received.

(2) In the above service usage terminal, the higher layer service may be an OBEX client, and the transmitting section may transmit a "DISCONNECT" to which stop request information on the service is added as the communication data on the transport layer including the request to the higher layer relating to the stop request of the service, or may transmit an object indicating the stop request of the service using a "PUT".

(3) In the above service usage terminal, the higher layer service may be an SCSI initiator, and the transmitting section may transmit an SCSI command indicating the stop request of the service, as the communication data on the transport layer including the request to the higher layer relating to the stop request of the service.

(4) In the service usage terminal, the higher layer service may be a PTP initiator, and the transmitting section may transmit a PTP operation indicating the stop request of the service, as the communication data on the transport layer including the request to the higher layer relating to the stop request of the service, or may transmit an object indicating the stop request of the service using a "Send Object".

(5) In the service usage terminal, the transmitting section may transmit the communication data on the transport layer including the request to the higher layer relating to the stop request of the service, to the service providing terminal which functions as an initiator in the transport layer.

(6) Further, according to an embodiment of the invention, a service providing terminal is provided including: a receiving section which receives communication data on a transport layer from a service usage terminal which uses service in a higher layer than the transport layer; and a transmitting section which transmits the communication data on the transport layer relating to a stop request of the service to the service usage terminal, when the received communication data on the transport layer includes a request to the higher layer relating to the stop request of the service.

(7) Further, according to an embodiment of the invention, a method of controlling a service usage terminal is provided, including: receiving communication data on a transport layer from a service providing terminal which provides service in a higher layer than a transport layer; performing a stopping process of a session layer protocol relating to the service, when the received communication data on the transport layer relates to a stop request of the service; receiving a trigger relating to the stop of the service; and transmitting the communication data on the transport layer including a request to the higher layer relating to the stop request of the service to the service providing terminal, when the trigger is received.

(8) Further, according to an embodiment of the invention, a method of controlling a service providing terminal is provided, including: receiving communication data on a transport layer from a service usage terminal which uses service in a higher layer than the transport layer; and transmitting the communication data on the transport layer relating to a stop request of the service to the service usage terminal, when the received communication data on the transport layer includes a request to the higher layer relating to the stop request of the service.

(9) Further, according to an embodiment of the invention, a service providing system is provided including: a service usage terminal which uses service in a higher layer than a transport layer; and a service providing terminal which provides the service. Here, the service usage terminal includes: a usage terminal receiving section which receives communication data on the transport layer from the service providing terminal; a control section which performs a stopping process of a session layer protocol relating to the service, when the received communication data of the transport layer relates to the stop request of the service; a trigger receiving section which receives a trigger relating to the stop of the service; and a usage terminal transmitting section which transmits the communication data on the transport layer including the request to the higher layer relating to the stop request of the service, to the service providing terminal, when the trigger is received. The service providing terminal includes: a providing terminal receiving section which receives the communication data on the transport layer from the service usage terminal; and a providing terminal transmitting section which transmits the communication data on the transport layer relating to the stop request of the service to the service usage terminal, when the received communication data on the transport layer includes the request to the higher layer relating to the stop request of the service.

BRIEF DESCRIPTION OF THE DRAWINGS

FIG. 6 is a diagram schematically illustrating data which is stored in a "Get Service List" response message according to the embodiment.

FIG. 7 is a diagram schematically illustrating a format of a service parameter according to the embodiment.

FIG. 8 is a diagram schematically illustrating data which is stored in a service start and stop request message according to the embodiment.

FIG. 9 is a diagram schematically illustrating data which is stored in a service start and stop response message according to the embodiment.

FIG. 16 is a diagram schematically illustrating a structure of data on CDB of an SCSI command indicating a "transmission command of a Service Start and Stop (stop) request message", according to the embodiment.

FIG. 20 is a diagram schematically illustrating a structure of data on a PTP operation indicating a "transmission command of a Service Start and Stop request (stop) message", according to the embodiment.

DETAILED DESCRIPTION OF THE INVENTION

Hereinafter, an embodiment of the invention will be described with reference to the accompanying drawings. An example of stopping the service and/or stopping the session layer protocol in an application where data transmission is performed between a digital camera and a personal computer (PC), or between two digital cameras, will be described in this embodiment.

Figure 1:
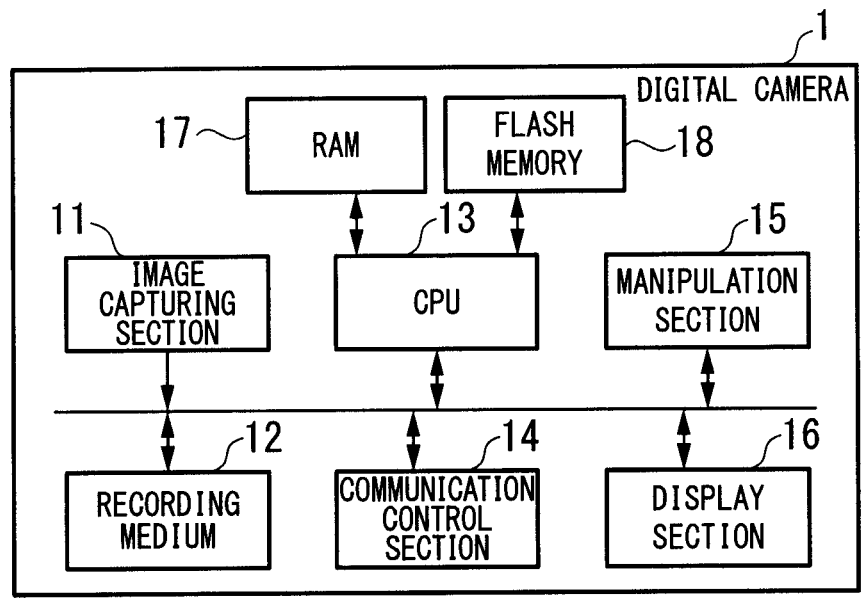
FIG. 1 is a block diagram illustrating a configuration of a digital camera according to an embodiment of the invention.

FIG. 1 is a block diagram illustrating a configuration of a digital camera according to the embodiment. In the example shown in the figure, a digital camera 1 includes an image capturing section 11, a recording medium 12, a CPU 13 (control section, trigger receiving section), a communication control section 14 (transmitting section, receiving section), a manipulation section 15, a display section 16, a RAM 17, and a flash memory 18.

The CPU 13 reads out a control program recorded in the flash memory 18 to be executed and reads and writes a variety of data in the RAM 17, and thus, controls overall operation of each section included in the digital camera 1. In the flash memory 18, a photographing parameter, a communication parameter (data communication protocol information or the like) or the like are stored, in addition to the control program.

The image capturing section 11 photographs an object to generate an image signal, and creates image data using a variety of image processes. The image data created by the image capturing section 11 is recorded in the recording medium 12. For example, a memory card which is detachable from the digital camera 1, a hard disk which is fixed in the digital camera 1, or the like is used as the recording medium 12.

The manipulation section 15 includes a manipulation switch or the like for receiving a command relating to an operation of the digital camera 1. The display section 16 displays the image data read out from the recording medium 12, a user interface screen or the like. The communication control section 14 is a communication interface which performs transmission and reception of data such as the captured image or the like with respect to an external device such as a PC, a printer, an external recording device or the like. The communication interface is widely used in information transmission and reception, and includes a wireless communication such as WLAN (Wireless LAN), Bluetooth (registered trademark), IrDA (registered trademark), TransferJet (registered trademark), WiMedia (registered trademark), or the like, in addition to wired communication.

Figure 2:
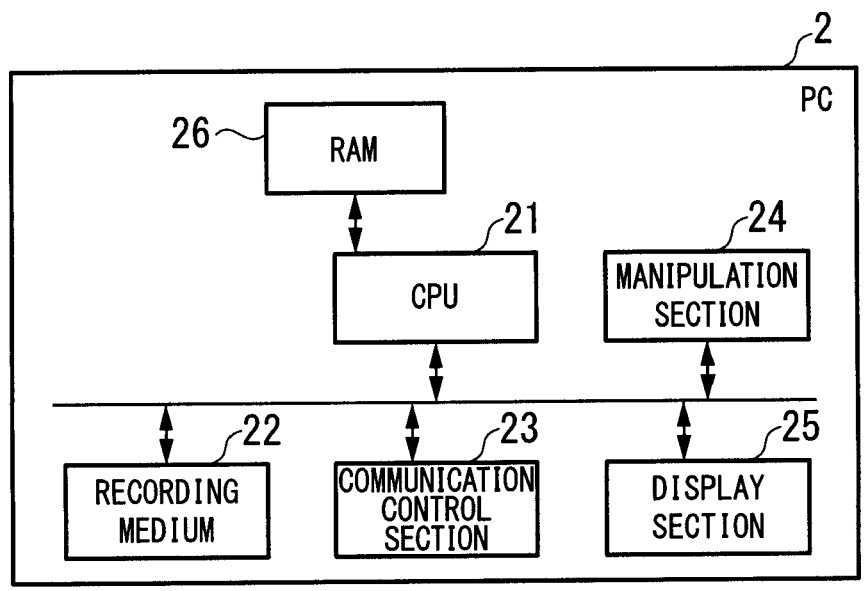
FIG. 2 is a block diagram illustrating a configuration of a personal computer according to the embodiment.

Next, a configuration of the PC will be described. FIG. 2 is a block diagram illustrating a configuration of the PC according to this embodiment. In an example shown in the figure, the PC 2 includes a CPU 21, a recording medium 22, a communication control section 23 (transmitting section, receiving section), a manipulation section 24, a display section 25, and a RAM 26.

The CPU 21 reads a control program recorded in the recording medium 22 to be executed and reads and writes a variety of data in the RAM 26, and thus, controls the overall operation of each section included in the PC 2. For example, a hard disk, a flash memory or the like is used as the recording medium 22. A variety of data such as document data or image data, in addition to the control program, is recorded in the recording medium 22.

The manipulation section 24 includes a keyboard, a mouse or the like for inputting a command relating to an operation of the PC 2. The display section 25 displays a user interface screen or the document data, the image data or the like read from the recording medium. The communication control section 23 is a communication interface which performs transmission and reception of a variety of data with respect to a device such as a digital camera 1 or a printer. The communication interface is widely used in information transmission and reception, and includes a wireless communication such as WLAN, Bluetooth (registered trademark), IrDA (registered trademark), TransferJet (registered trademark), WiMedia (registered trademark), or the like, in addition to wired communication.

Figures 3, 4, 5:
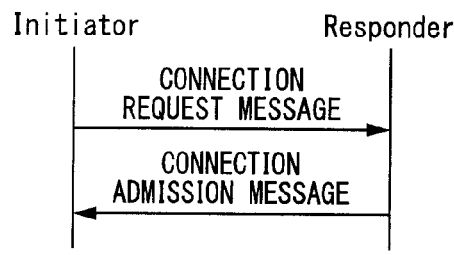
FIG. 3 is a sequence diagram illustrating a connection procedure between an initiator and a request according to the embodiment.
FIG. 4 is a diagram schematically illustrating a format of a message according to the embodiment.
FIG. 5 is a diagram schematically illustrating data which is stored in a "Get Service List" request message according to the embodiment.

Next, a communication method in which the communication control section 14 of the digital camera 1 and the communication control section 23 of the PC 2 are used will be described. In this embodiment, the communication control section 14 of the digital camera 1 and the communication control section 23 of the PC 2 use a communication method which adopts a master-slave type transport layer protocol. The communication method which adopts the master-slave type transport layer protocol is a communication method in which one device which performs communication functions as a host and the other device functions as a device, and the host controls the data transmission and reception, such as a USB (Universal Serial Bus), for example. Further, as shown in FIG. 3, when one device which performs communication functions as an initiator and the other device functions as a responder, and the initiator transmits a connection request message as a connection request and the responder that receives the connection request message allows connection, a communication method of transmitting a connection acceptance message to the initiator is also the communication method which adopts the master-slave type transport layer protocol. In the invention, the transport layer protocol communication data includes communication data on a communication protocol higher than the transport layer protocol.

In the above-described communication methods, start and stop of a service and/or a session layer protocol (OBEX (Object Exchange), SCSI, PTP or the like) are controlled by the host or the initiator. For example, if the communication method is USB, the host issues a "SetConfiguration" device request to the device, to thereby perform the start and stop of the session layer protocol.

Hereinafter, this embodiment will be described using the communication method which adopts the transport layer protocol as shown in FIG. 3. In the transport layer protocol of the communication method according to this embodiment, the following message is transmitted and received between the initiator and the responder, and thus, the start and stop of the service are performed. The message transmitted and received between the initiator and the responder is a request message issued to the responder from the initiator, and a response message returned to the initiator from the responder.

Next, a format of the message used in this embodiment will be described. FIG. 4 is a diagram schematically illustrating the format of a message used in this embodiment. Zeroth byte data on the message used in this embodiment represents "Message Type". First byte data represents "Message Code". Second to fifth byte data represent "Parameters". Sixth and seventh byte data represent "Length". Eighth byte data and thereafter represent "Data".

In the "Message Type" information indicating whether the message is a "request message" or a "response message" is set (stored).

In the "Message Code" information identifying the message is set. In the "Parameters" information indicating content defined for every "Message Code" is set. In the "Length" information indicating the size of subsequent "Data" is set.

In the "Data" data defined for every "Message Code" is set.

Next, a "Get Service List" request message among messages used in this embodiment will be described. The "Get Service List" request message is a message for obtaining a list of service and/or protocol corresponding to the responder, and is transmitted to the responder from the initiator.

FIG. 5 is a diagram schematically illustrating data stored in a "Get Service List" message used in this embodiment. In the example shown in the figure, in the "Message Type" of the "Get Service List" request message "Message Type=0x00" indicating the request message is set. In the "Message Code" "Message Code=0x01" indicating a "Get Service List" message is set. The "Parameters" is reserved so that information indicating the content defined for every Message Code can be set. In the "Length" "Length=0" indicating that the subsequent "Data" is not present is set.

Next, a "Get Service List" response message among messages used in this embodiment will be described. The "Get Service List" response message is a message for returning a list of service and/or protocol corresponding to the responder, in response to the "Get Service List" request message, and is transmitted to the initiator from the responder.

FIG. 6 is a diagram schematically illustrating data which is stored in a "Get Service List" response message used in this embodiment. In the example shown in the figure, in the "Message Type" of the "Get Service List" response message "Message Type=0x01" indicating the response message is set. In the "Message Code", "Message Code=0x01" indicating a "Get Service List" message is set. In a part (second byte in the message) of the "Parameters", "Number of Service Parameter=m" indicating the number (m) of service parameters after the eighth byte message is set, and the remaining part (3-byte to 5-byte in the message) thereof is reserved so that information indicating the content defined for every Message Code can be set. In the "Length", "Length=size of eighth byte and thereafter" indicating the size (size of 8-byte and thereafter) of the subsequent "Data" is set. In the "Data", "Service Parameter #0 to Service Parameter #m−1" which are parameters relating to the service or protocol are set.

Next, a format of the service parameter will be described. FIG. 7 is a diagram schematically illustrating a format of the service parameter used in this embodiment. Zeroth byte data on the service parameter used in this embodiment represents "Protocol Code". First byte data represents "Class Code". Second byte data represents "Result Code". Third to fifth byte data is reserved so that information relating to the service parameter can be set. Sixth and seventh byte data represent "Length". Eighth byte data and thereafter represent "Service Information".

In the "Protocol Code" a code indicting a protocol type (OBEX/SCSI/PTP or the like) is set. In the "Class Code", a class code defined for every protocol type is set. For example, when the protocol type is OBEX, a code indicating "OBEX Push Server", "OBEX Push Client" or the like is set. Further, when the protocol type is SCSI, a code indicating "SCSI Block Device—Target", "SCSI Block Device—Initiator" or the like is set. Further, when the protocol type is PTP, a code indicating "PTP Initiator", "PTP Responder" or the like is set.

In the "Result Code" a processing result is set. For example, when the process is normally terminated, a code indicating success is set. In the "Length", the size of the "Service Information" is set. In the "Service Information" information (for example, corresponding file format or the like) relating to the service of an application layer is set.

Next, a service start and stop request message among messages in this embodiment will be described. The "Service Start and Stop" request message is a message for requesting the start of the service and/or protocol in the designated service parameter or the stop of the service and/or protocol being started of the responder at that time, which is transmitted to the responder from the initiator. When the length of the service start and stop request message is zero, that is, when the service parameter is not present, this represents a Service Stop request.

FIG. 8 is a diagram schematically illustrating data stored in the "Service Start and Stop" request message ("Set Service" request message) used in this embodiment. In an example shown in the figure, in the "Message Type" of the "Service Start and Stop" request message "Message Type=0x00" indicating the request message is set. In the "Message Code", "Message Code=0x02" indicating a "Set Service" message is set.

The "Parameters" is reserved so that information indicating the content defined for every "Message Code" can be set. In the "Length", "Length=the size of eighth byte and thereafter" indicating the size (size of eighth byte and thereafter) of the subsequent "Service Parameter" is set. In the "Service Parameter", "Service Parameter" which is a parameter relating to the service is set. In this embodiment, a service start and stop request message in which "Length=0" in the "Length" is set, that is, a service start and stop request message without "Service Parameter" represents a Service Stop request.

Next, a "Service Start and Stop" response message among messages used in this embodiment will be described. The "Service Start and Stop" response message is a response message for the "Service Start and Stop" request message, and is transmitted to the initiator from the responder.

FIG. 9 is a diagram schematically illustrating data which is stored in the "Service Start and Stop" response message ("Set Service" response message) used in this embodiment. In an example shown in the figure, in the "Message Type" of the service start and stop response message, "Message Type=0x01" indicating the response message is set. In the "Message Code", "Message Code=0x02" indicating a "Set Service" message is set. Part (second byte in the message) of "Parameters" represents "Result code" and a processing result is set therein. For example, when the processing is normally terminated, a code indicating success is set in the "Result Code". The remaining part (third to fifth bytes in the message) of the "Parameters" is reserved so that information indicating the content defined for every Message Code can be set. In the "Length", "Length=0" indicating that the subsequent "Data" is not present is set.

[Method of Stopping Service when the Session Layer Protocol is an OBEX Protocol]

Next, a method of stopping the service when the session layer protocol is the OBEX protocol will be described. When the session layer protocol is the OBEX protocol, it is possible that "the PC 2 operates as the initiator, and the digital camera 1 operates as the responder, when the data transmission and reception is performed between the digital camera 1 and the PC 2", "the digital camera 1 operates as the initiator, and the PC 2 operates as the responder, when the data transmission and reception is performed between the digital camera 1 and the PC 2", or "one digital camera 1 operates as the initiator, and the other digital camera 1 operates as the responder, when the data transmission and reception is performed between two digital cameras 1".

Figure 10:
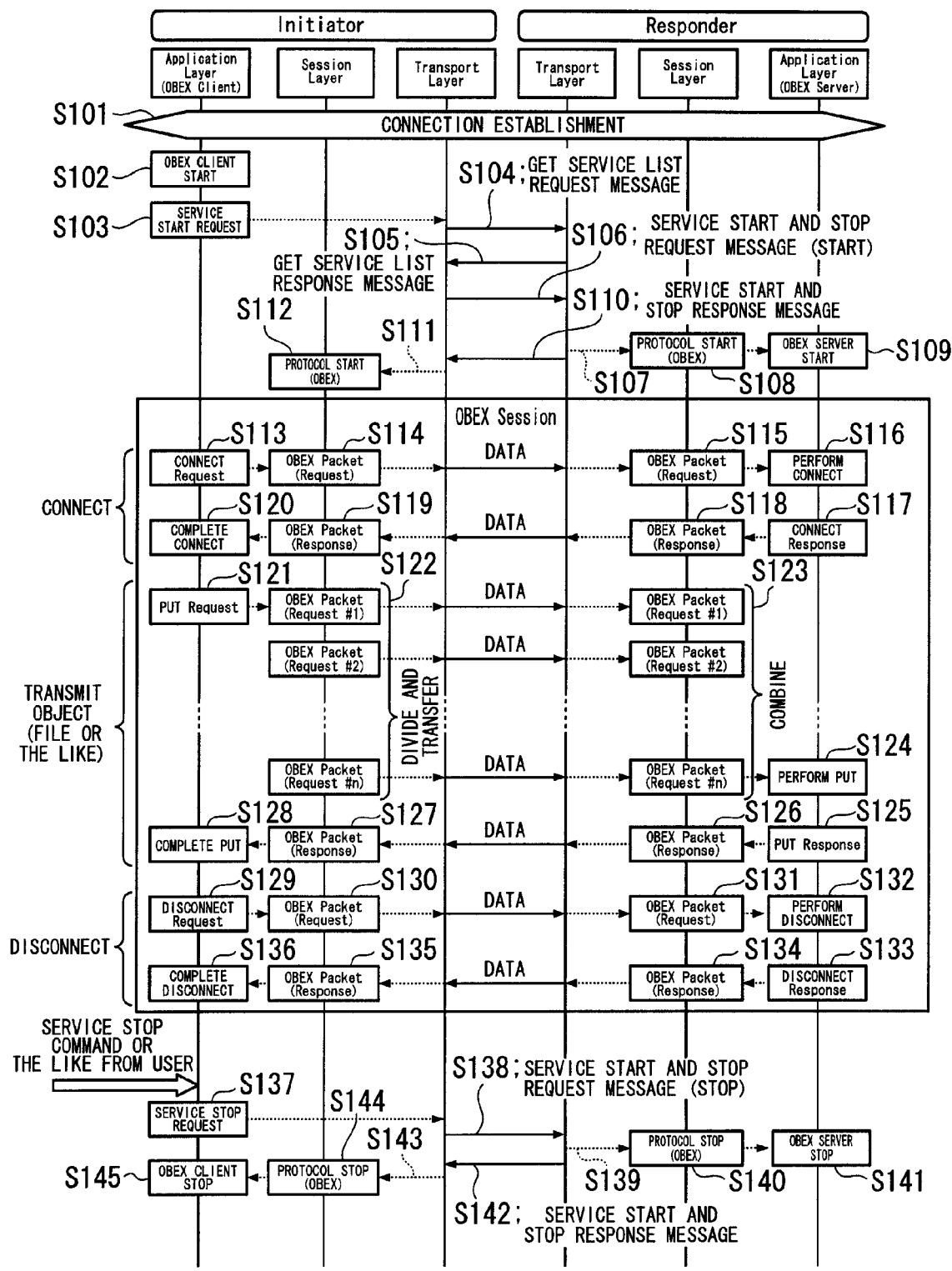
FIG. 10 is a sequence diagram illustrating a Service Stop procedure from an initiator, when a session layer protocol is an OBEX protocol, the initiator is a client, and a responder is a server, according to the embodiment.

FIG. 10 is a sequence diagram illustrating a Service Stop procedure from an initiator, when a session layer protocol is an OBEX protocol, the initiator is an OBEX client (service usage terminal), and a responder is an OBEX server (service providing terminal). In this embodiment, the CPUs 13 and 21 operate as an application layer and a session layer, and the communication control sections 14 and 23 operate as a transport layer. Alternatively, the CPUs 13 and 21 operate as the application layer, and the communication control sections 14 and 23 operate as the session layer and the transport layer.

The initiator and the responder establish communication connection (step S101). Specifically, as shown in FIG. 3, the initiator makes a connection request to the responder and the responder allows the connection request.

If the communication connection between the initiator and the responder is established, the application layer of the initiator starts the OBEX client (step S102).

If the OBEX client is started, the application layer of the initiator requests the start of the service of the transport layer (step S103).

The transport layer of the initiator which receives the request of the service start transmits a "Get Service List" request message to the transport layer of the responder (step S104).

The transport layer of the responder which receives the "Get Service List request message transmits a "Get Service List" response message in which service corresponding to the responder is set in the "Service Parameter", to the transport layer of the initiator (step S105).

In a case where service parameters in which the "Protocol Code" is "OBEX" and the "Class Code" is "OBEX Push Server" are present in the "Get Service List" response message, the transport layer of the initiator which receives the "Get Service List" response message starts an "OBEX Push Server" transmits the service start and stop request message (start) to the transport layer of the responder in order to start the "OBEX Push Server" (step S106).

The transport layer of the responder which receives the service start and stop request message (start) requests the start of the OBEX protocol of the session layer of the responder (step S107).

The session layer of the responder which receives the start request of the OBEX protocol starts the OBEX protocol, and requests the start of the OBEX server of the application layer of the responder (step S108).

The application layer of the responder which receives the start request of the OBEX server starts the OBEX server (step S109).

The transport layer of the responder which requests the start of the OBEX protocol of the session layer of the responder transmits the "Service Start and Stop" response message to the transport layer of the initiator (step S110).

The transport layer of the initiator which receives the "Service Start and Stop" response message requests the start of the OBEX protocol of the session layer of the initiator (step S111).

The session layer of the initiator which receives the start request of the OBEX protocol starts the OBEX protocol (step S112).

After the session layer of the initiator starts the OBEX protocol, the application layer of the initiator inputs a "CONNECT" request to the session layer of the initiator (step S113).

The session layer of the initiator converts the input "CONNECT" request into an OBEX packet (request) (step S114). Subsequently, the session layer of the initiator transmits the converted OBEX packet (request) to the session layer of the responder through the transport layers of the initiator and the responder.

The session layer of the responder converts the received OBEX packet (request) into a "CONNECT" request (step S115). Subsequently, the session layer of the responder inputs the converted "CONNECT" request to the application layer of the responder.

The application layer of the responder to which the "CONNECT" request is input performs a connect operation (step S116).

The application layer of the responder inputs a "CONNECT" response to the session layer of the responder in order to notify that the connect operation has been performed (step S117).

The session layer of the responder to which the "CONNECT" response is input converts the "CONNECT" response into the OBEX packet (response) (step S118). Subsequently, the session layer of the responder transmits the converted OBEX packet (response) to the session layer of the initiator through the transport layers of the responder and the initiator.

The session layer of the initiator converts the received OBEX packet (response) into a "CONNECT" response (step S119). Subsequently, the session layer of the initiator inputs the converted "CONNECT" response to the application layer of the initiator.

The application layer of the initiator to which the "CONNECT" response is input completes the connect operation (step S120).

After the connect operation is completed, the application layer of the initiator inputs a "PUT" request including an object (file or the like) which is a transmission target to the session layer of the initiator (step S121).

The session layer of the initiator converts the input "PUT" request into an OBEX packet (request #1) to an OBEX packet (request #n) (step S122). Subsequently, the session layer of the initiator transmits the converted OBEX packet (request #1) to OBEX packet (request #n) to the session layer of the responder, through the transport layers of the initiator and the responder.

The session layer of the responder converts the received OBEX packet (request #1) to OBEX packet (request #n) into a "PUT" request (step S123). Subsequently, the session layer of the responder inputs the converted "PUT" request to the application layer of the responder.

The application layer of the responder to which the "PUT" request is input performs a put operation (step S124).

The application layer of the responder inputs a "PUT" response to the session layer of the responder in order to notify that the put operation is performed (step S125).

The session layer of the responder converts the input "PUT" response into an OBEX packet (response) (step S126). Subsequently, the session layer of the responder transmits the converted OBEX packet (response) to the session layer of the initiator through the transport layers of the responder and the initiator.

The session layer of the initiator converts the received OBEX packet (response) into the "PUT" response (step S127). Subsequently, the session layer of the initiator inputs the converted "PUT" response to the application layer of the initiator.

The application layer of the initiator to which the "PUT" response is input completes the put operation (step S128).

After the put operation is completed, the application layer of the initiator inputs a "DISCONNECT" request to the session layer of the initiator (step S129).

The session layer of the initiator converts the input "DISCINNECT" request into an OBEX packet (request) (step S130). Subsequently, the session layer of the initiator transmits the converted OBEX packet (request) to the session layer of the responder through the transport layers of the initiator and the responder.

The session layer of the responder converts the received OBEX packet (request) into the "DISCONNECT" request (step S131). Subsequently, the session layer of the responder inputs the converted "DISCONNECT" request to the application layer of the responder.

The application layer of the responder to which the "DISCONNECT" request is input performs the disconnection operation (step S132).

The application layer of the responder inputs a "DISCONNECT" response to the session layer of the responder in order to notify that the disconnect operation is performed (step S133).

The session layer of the responder converts the input "DISCONNECT" response into an OBEX packet (response) (step S134). Subsequently, the session layer of the responder transmits the converted OBEX packet (response) to the session layer of the initiator through the transport layers of the initiator and the responder.

The session layer of the initiator converts the received OBEX packet (response) into the "DISCONNECT" response (step S135). Subsequently, the session layer of the initiator inputs the converted "DISCONNECT" response to the application layer of the initiator.

The application layer of the initiator to which the "DISCONNECT" response is input completes the disconnect operation (step S136).

If a Service Stop command from the user is input to the initiator, the application layer of the initiator requests the stop of the service of the transport layer (step S137).

The transport layer of the initiator which receives the Service Stop request transmits the "Service Start and Stop (Stop)" request message to the transport layer of the responder (step S138).

The transport layer of the responder which receives the "Service Start and Stop (stop)" request message requests the stop of the OBEX protocol of the session layer of the responder (step S139).

The session layer of the responder which receives the stop request of the OBEX protocol stops the OBEX protocol, and requests the stop of the OBEX server of the application layer of the responder (step S140).

The application layer of the responder which receives the stop request of the OBEX server stops the OBEX server (step S141).

The transport layer of the responder which requests the stop of the OBEX protocol of the session layer of the responder transmits the "Service Start and Stop" response message to the transport layer of the initiator (step S142).

The transport layer of the initiator which receives the "Service Start and Stop" response message requests the stop of the OBEX protocol of the session layer of the initiator (step S143).

The session layer of the initiator which receives the stop request of the OBEX protocol stops the OBEX protocol, and requests the stop of the OBEX client of the application layer of the initiator (step S144).

The application layer of the initiator which receives the stop request of the OBEX client stops the OBEX client (step S145).

Through the above-described procedure, when the session layer protocol is the OBEX protocol, the initiator is the OBEX client (service usage terminal), and the responder is the OBEX server (service providing terminal), it is possible to stop the service from the initiator side.

Figure 11:
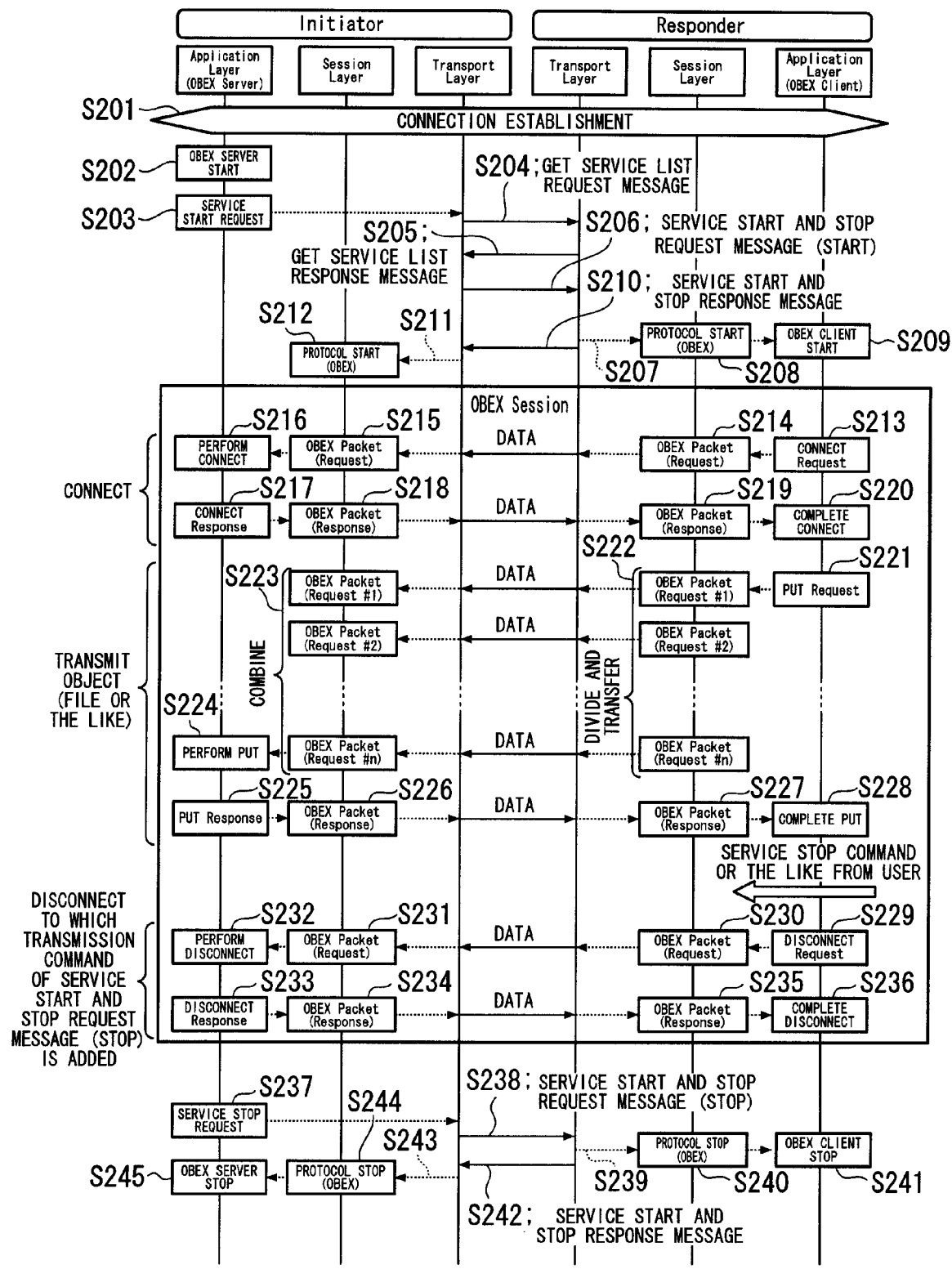
FIG. 11 is a sequence diagram illustrating a Service Stop procedure from a responder when a "DISCONNECT" is used, a session layer protocol is an OBEX protocol, an initiator is a server, and the responder is a client, according to the embodiment.

FIG. 11 is a sequence diagram illustrating a Service Stop procedure from a responder when a "DISCONNECT" is used, and when a session layer protocol is an OBEX protocol, an initiator is an OBEX server (service providing terminal), and the responder is an OBEX client (service usage terminal).

A process in step S201 is the same as the process in step S101 in FIG. 10.

If the communication connection between the initiator and the responder is established, the application layer of the initiator starts the OBEX server (step S202).

If the OBEX server is started, the application layer of the initiator requests the start of the service of the transport layer (step S203).

The transport layer of the initiator which receives the service start request transmits a "Get Service List" request message to the transport layer of the responder (step S204).

The transport layer of the responder which receives the "Get Service List" request message transmits a "Get Service List" response message in which service corresponding to the responder is set in the service parameter, to the transport layer of the initiator (step S205).

When service parameters in which the "Protocol Code" is "OBEX" and the "Class Code" is "OBEX Push Client" are present in the "Get Service List" response message, the transport layer of the initiator which receives the "Get Service List" response message transmits the "Service Start and Stop (start)" request message to the transport layer of the responder in order to start the "OBEX Push Client" (step S206).

The transport layer of the responder which receives the "Service Start and Stop (start)" request message requests the start of the OBEX protocol of the session layer of the responder (step S207).

The session layer of the responder which receives the start request of the OBEX protocol starts the OBEX protocol, and requests the start of the OBEX client of the application layer of the responder (step S208).

The application layer of the responder which receives the start request of the OBEX client starts the OBEX client (step S209).

The transport layer of the responder which requests the start of the OBEX protocol of the session layer of the responder transmits the "Service Start and Stop" response message to the transport layer of the initiator (step S210).

The transport layer of the initiator which receives the "Service Start and Stop" response message requests the start of the OBEX protocol of the session layer of the initiator (step S211).

The session layer of the initiator which receives the start request of the OBEX protocol starts the OBEX protocol (step S212).

After the session layer of the responder starts the OBEX protocol, the application layer of the responder inputs a connect request to the session layer of the responder (step S213).

The session layer of the responder converts the input "CONNETC" request into an OBEX packet (request) (step S214). Subsequently, the session layer of the responder transmits the converted OBEX packet (request) to the session layer of the initiator, through the transport layers of the responder and the initiator.

The session layer of the initiator converts the received OBEX packet (request) into a "CONNECT" request (step S215). Subsequently, the session layer of the initiator inputs the converted "CONNECT" request to the application layer of the initiator.

The application layer of the initiator to which the "CONNECT" request is input performs a connect operation (step S216).

The application layer of the initiator inputs a "CONNECT" response to the session layer of the initiator in order to notify that the connect operation has been performed (step S217).

The session layer of the initiator to which the "CONNECT" response is input converts the "CONNECT" response into an OBEX packet (response) (step S218). Subsequently, the session layer of the initiator transmits the converted OBEX packet (response) to the session layer of the responder, through the transport layers of the initiator and the responder.

The session layer of the responder converts the received OBEX packet (response) into a "CONNECT" response (step S219). Subsequently, the session layer of the responder inputs the converted "CONNECT" response to the application layer of the responder.

The application layer of the responder to which the "CONNECT" response is input completes the connect operation (step S220).

After the connect operation is completed, the application layer of the responder inputs a "PUT" request including an object (file or the like) which is a transmission target, to the session layer of the responder (step S221).

The session layer of the responder converts the input "PUT" request into an OBEX packet (request #1) to an OBEX packet (request #n) (step S222). Subsequently, the session layer of the responder transmits the converted OBEX packet (request #1) to OBEX packet (request #n) to the session layer of the initiator, through the transport layers of the responder and the initiator.

The session layer of the initiator converts the received OBEX packet (request #1) to OBEX packet (request #n) into a "PUT" request (step S223). Subsequently, the session layer of the initiator inputs the converted "PUT" request to the application layer of the initiator.

The application layer of the initiator to which the "PUT" request is input performs a put operation, and obtains an object from the "PUT" request (step S224).

The application layer of the initiator inputs a "PUT" response to the session layer of the initiator in order to notify that the put operation is performed (step S225).

The session layer of the initiator converts the input "PUT" response into an OBEX packet (response) (step S226). Subsequently, the session layer of the initiator transmits the converted OBEX packet (response) to the session layer of the responder, through the transport layers of the initiator and the responder.

The session layer of the responder converts the received OBEX packet (response) into the "PUT" response (step S227). Subsequently, the session layer of the responder inputs the converted "PUT" response to the application layer of the responder.

The application layer of the responder to which the "PUT" response is input completes the put operation (step S228).

If a stop command of the service is input to the responder from the user, the application layer of the responder sets a character string (for example, "SRVSTOP") indicating a "transmission command of the Service Start and Stop (stop) request message" in an OBEX Header "Description" of the "DISCONNECT" request (step S229). Subsequently, the application layer of the responder inputs the "DISCONNECT" request in which the character string indicating the "transmission command of the Service Start and Stop (stop) request message" is set, to the session layer of the responder.

The session layer of the responder converts the input "DISCONNECT" request into an OBEX packet (request) (step S230). Subsequently, the session layer of the responder transmits the converted OBEX packet (request) to the session layer of the initiator, through the transport layers of the responder and the initiator.

The session layer of the initiator converts the received OBEX packet (request) into the "DISCONNECT" request (step S231). Subsequently, the session layer of the initiator inputs the converted "DISCONNECT" request to the application layer of the initiator.

The application layer of the initiator performs the disconnect operation, based on the input "DISCONNECT" request (step S232).

The application layer of the initiator inputs a "DISCONNECT" response to the session layer of the initiator in order to notify that the disconnect operation has been performed (step S233).

The session layer of the initiator to which the "DISCONNECT" response is input converts the "DISCONNECT" response into an OBEX packet (response) (step S234). Subsequently, the session layer of the initiator transmits the converted OBEX packet (response) to the session layer of the initiator, through the transport layers of the initiator and the responder.

The session layer of the responder converts the received OBEX packet (response) into the "DISCONNECT" response (step S235). Subsequently, the session layer of the responder inputs the converted "DISCONNECT" response to the application layer of the responder.

The application layer of the responder to which the "DISCONNECT" response is input completes the disconnect operation (step S236).

When a character string indicating the "transmission command of the Service Start and Stop (stop) request message" is set in the OBEX Header "Description" of the "DISCONNECT" request after the "DISCONNECT" response is input to the session layer of the initiator in step S233, the application layer of the initiator requests the Service Stop of the transport layer (step S237).

The transport layer of the initiator which receives the Service Stop request transmits the "Service Start and Stop (stop)" request message to the transport layer of the responder (step S238).

The transport layer of the responder which receives the "Service Start and Stop" request message (stop) requests the stop of the OBEX protocol of the session layer of the responder (step S239).

The session layer of the responder which receives the stop request of the OBEX protocol stops the OBEX protocol, and requests the stop of the OBEX client of the application layer of the responder (step S240).

The application layer of the responder which receives the stop request of the OBEX client stops the OBEX client (step S241).

The transport layer of the responder which requests the stop of the OBEX protocol of the session layer of the responder transmits the "Service Start and Stop" response message to the transport layer of the initiator (step S242).

The transport layer of the initiator which receives the "Service Start and Stop" response message requests the stop of the OBEX protocol of the session layer of the initiator (step S243).

The session layer of the initiator which receives the stop request of the OBEX protocol stops the OBEX protocol, and requests the stop of the OBEX server of the application layer of the initiator (step S244).

The application layer of the initiator which receives the stop request of the OBEX server stops the OBEX server (step S245).

As described above, the OBEX client (responder) sets the character string indicating the "transmission command of the Service Start and Stop (stop) request message" in the OBEX header "Description" of the "DISCONNECT" request, and transmits it to the OBEX server (initiator). Then, if the character string indicating the "transmission command of the Service Stop and Stop (stop) request message" is set in the OBEX header "Description" of the "DISCONNECT" request, the OBEX server which receives the "DISCONNECT" request transmits the "DISCONNECT" response to the OBEX client. Thereafter, the OBEX server transmits the "Service Start and Stop (stop) request message" of the transport layer to the OBEX client, and gives an instruction to stop the session layer protocol in the OBEX client side and the OBEX client in the application layer.

Accordingly, when the session layer protocol is the OBEX protocol, the initiator is the OBEX server (service providing terminal), and the responder is the OBEX client (service usage terminal), it is possible to stop the service from the responder side using the "DISCONNECT".

Figure 12:
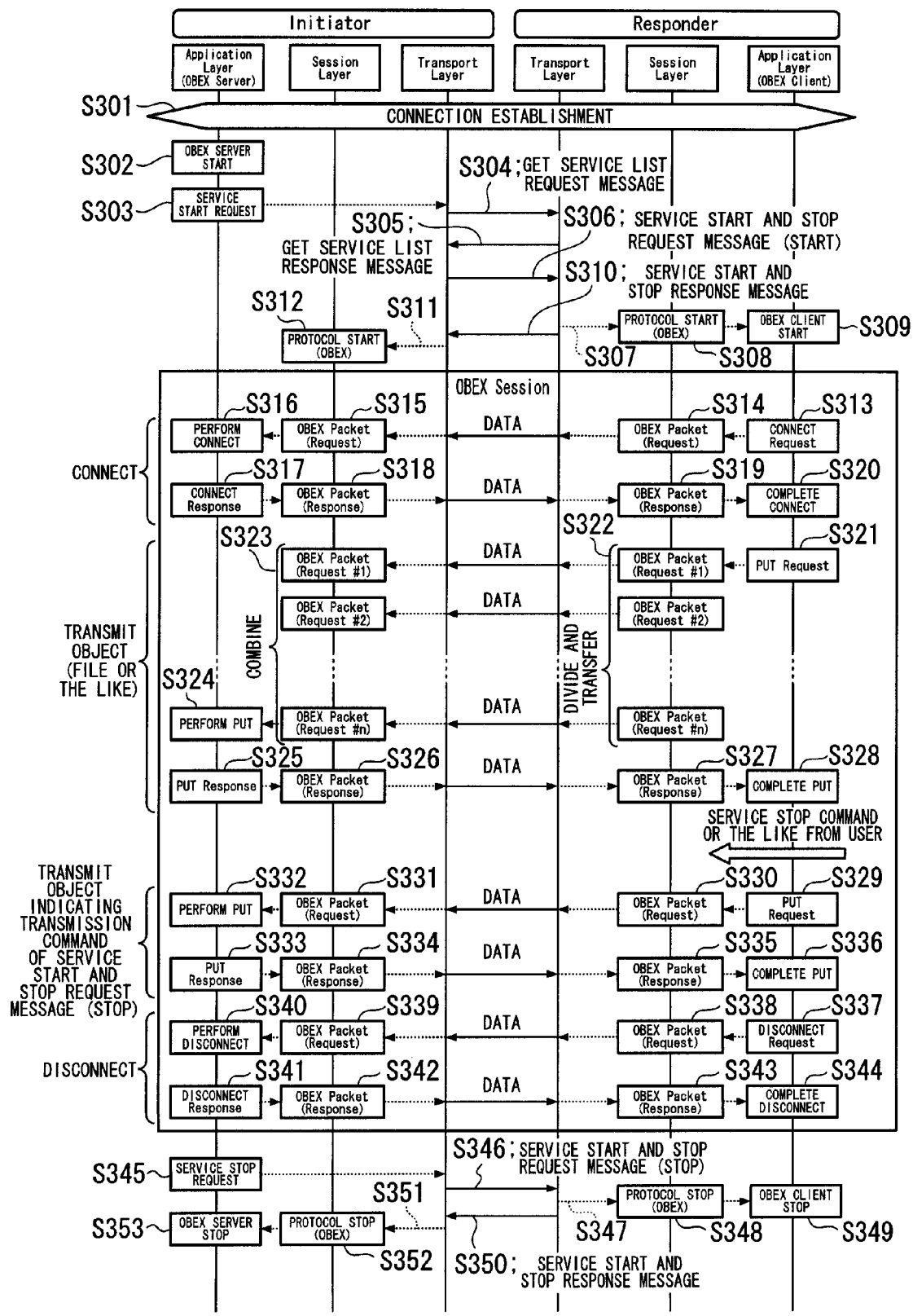
FIG. 12 is a sequence diagram illustrating a Service Stop procedure from a responder when a "PUT" is used, a session layer protocol is an OBEX protocol, an initiator is a server, and the responder is a client, according to the embodiment.

FIG. 12 is a sequence diagram illustrating a Service Stop procedure from the side of a responder when a "PUT" request is used, and when a session layer protocol is an OBEX protocol, an initiator is an OBEX server (service providing terminal), and the responder is a client (service usage terminal).

Processes in steps S301 to S328 are the same as the processes in steps S201 to S228 in FIG. 11. Accordingly, description of the processes in steps S301 to S328 will be omitted.

If the stop command of the service is input to the responder from the user, the application layer of the responder inputs the "put request" including an object indicating the "transmission command of the Service Start and Stop (stop) request message" to the session layer of the responder (step S329).

The session layer of the responder converts the input "PUT" request into the OBEX packet (request) (step S330). Subsequently, the session layer of the responder transmits the converted OBEX packet (request) to the session layer of the initiator, through the transport layers of the responder and the initiator.

The session layer of the initiator converts the received OBEX packet (request) into the "PUT" request (step S331). Subsequently, the session layer of the initiator inputs the converted "PUT" request to the application layer of the initiator.

The application layer of the initiator to which the "PUT" request is input performs the put operation, and obtains the object from the "PUT" request (step S332).

The application layer of the initiator inputs the "PUT" response to the session layer of the initiator in order to notify that the put operation is performed (step S333).

The session layer of the initiator converts the input "PUT" response into the OBEX packet (response) (step S334). Subsequently, the session layer of the initiator transmits the converted OBEX packet (response) to the session layer of the responder, through the transport layers of the initiator and the responder.

The session layer of the responder converts the received OBEX packet (response) into the "PUT" response (step S335).

Subsequently, the session layer of the responder inputs the converted "PUT" response into the application layer of the responder.

The application layer of the responder to which the "PUT" response is input completes the put operation (step S336).

After the put operation is completed, the application layer of the responder inputs the "DISCONNECT" request (step S337).

The session layer of the responder converts the input "DISCONNECT" request into the OBEX packet (request) (step S338). Subsequently, the session layer of the responder transmits the converted OBEX packet (request) to the session layer of the initiator, through the transport layers of the responder and the initiator.

The session layer of the initiator converts the received OBEX packet (request) into the "disconnect request" (step S339). Subsequently, the session layer of the initiator inputs the converted "DISCONNECT" request to the application layer of the initiator.

The application layer of the initiator to which the "DISCONNECT" request is input performs the disconnect operation (step S340).

The application layer of the initiator inputs the "DISCONNECT" response to the session layer of the initiator in order to notify that the disconnect operation is performed (step S341).

The session layer of the initiator converts the input "DISCONNECT" response into the OBEX packet (response) (step S342). Subsequently, the session layer of the initiator transmits the converted OBEX packet (response) to the session layer of the responder, through the transport layers of the initiator and the responder.

The session layer of the responder converts the received OBEX packet (response) into the "DISCONNECT" response (step S343). Subsequently, the session layer of the responder inputs the converted "DISCONNECT" response to the application layer of the responder.

The application layer of the responder to which the "DISCONNECT" response is input completes the disconnect operation (step S344).

After the disconnect response is input to the session layer of the initiator in step S341, when the object obtained in step S332 is an object indicating the "transmission command of the Service Start and Stop (stop) request message", the application layer of the initiator requests the Service Stop of the transport layer (step S345).

Processes in steps S346 to S353 are the same as the processes in steps S238 to S245 in FIG. 11. Accordingly, description of the processes in steps S346 to S353 will be omitted.

As described above, the OBEX client (responder) puts the object indicating the "transmission command of the Service Start and Stop (stop) request message" to the OBEX server (initiator). Then, the OBEX server which receives the object indicating the "transmission command of the Server Start and Stop (stop) request message" transmits the "put response" to the OBEX client. Subsequently, the OBEX client which receives the "PUT" response transmits the "DISCONNECT" request to the OBEX server (initiator). Then, the OBEX server which receives the "DISCONNECT" request transmits, if it receives the "DISCONNECT" response, the "DISCONNECT" response to the OBEX client. Thereafter, the OBEX server which receives the object indicating the "transmission command of the Service Start and Stop (stop) request message" before receiving the "DISCONNECT" request transmits the "Service Start and Stop (stop)" request message of the transport layer to the OBEX client, and instructs the stop of the session layer protocol of the OBEX client side and the OBEX client of the application layer.

Accordingly, in a case where the session layer protocol is the OBEX protocol, the initiator is the OBEX server (service providing terminal), and the responder is the OBEX client (service usage terminal), it is possible to stop the service from the responder side using the "PUT" request.

In the above-described example, an example in which the disconnect operations (steps S337 to S344) are performed is shown, but the disconnect operations may not be performed. Specifically, after the processes (steps S329 to S336) of receiving the object indicating the "transmission command of the Service Start and Stop (stop) request message" are performed, the OBEX server (service providing terminal) may request the Service Stop and perform the Service Stopping processes (steps S345 to S353). In this way, even though there is no disconnect operation, the OBEX server (service providing terminal) can output the Service Stop request.

Further, an example of an object indicating the "transmission command of the Service Start and Stop (stop) request message" is described hereinafter.

An object in which the object name (for example, "SRVSTOP.SCR") indicating the "transmission command of the Service Start and Stop (stop) request message" is set in an OBEX Header "Name" of the "PUT" request An object in which the object type (for example, "application/vnd.foo-srvstop") indicating the "transmission command of the Service Start and Stop (stop) request message" is set in an OBEX header "Type" of the "PUT" request An object which is described by a structured language (XML: Extensible Markup Language) and describes information indicating the "transmission command of the Service Start and Stop (stop) request message"

Figures 13, 14:
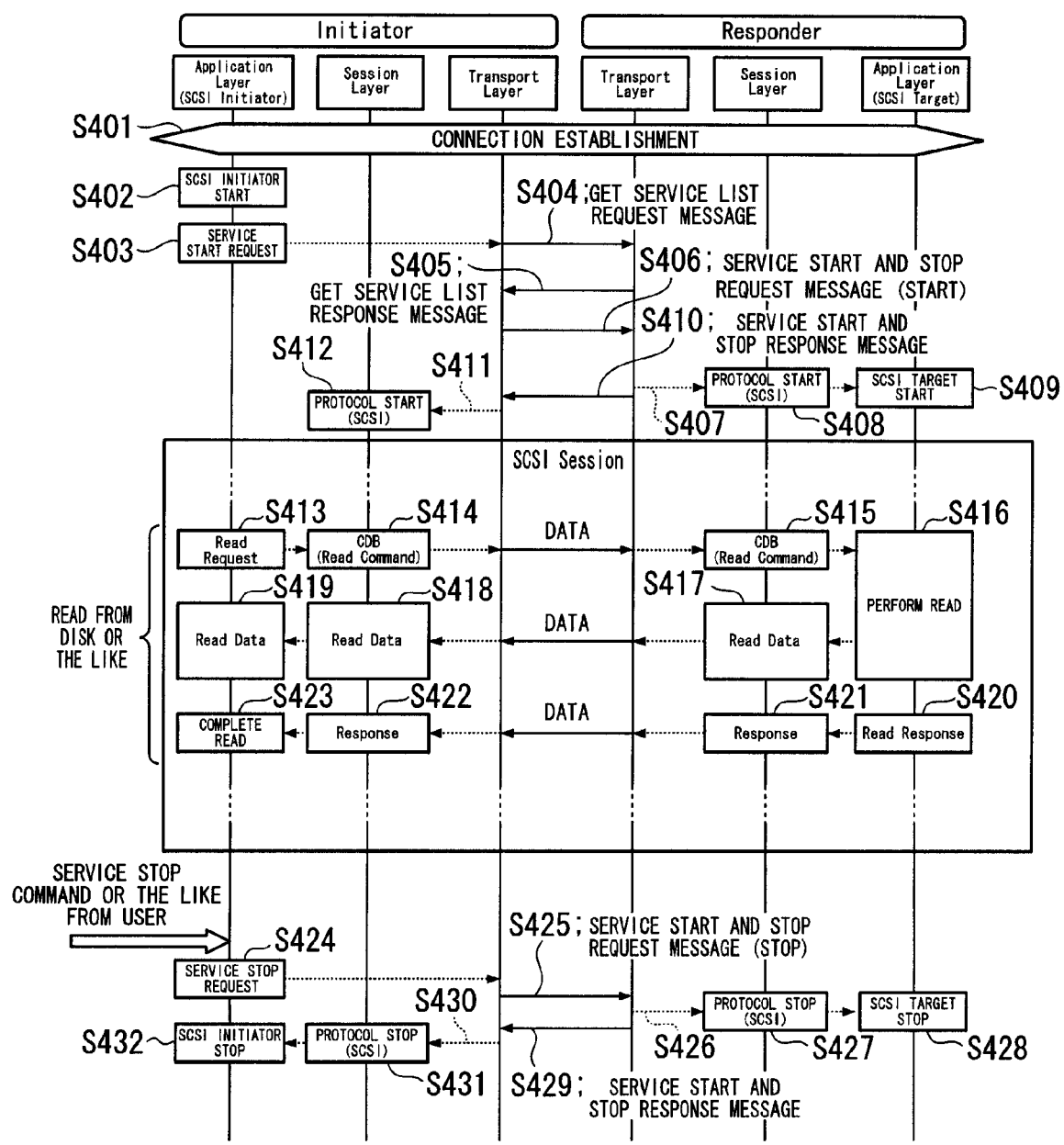
FIG. 13 is a diagram illustrating an example of an object in which information indicating a "transmission command of a Service Start and Stop (stop) request message" is described, according to the embodiment.
FIG. 14 is a sequence diagram illustrating a Service Stop procedure from an initiator, when a session layer protocol is an SCSI protocol, the initiator is a client, and a responder is a server, according to the embodiment.

FIG. 13 shows an example of an object which is described by a structured language and describes information indicating the "transmission command of the Service Start and Stop (stop) request message". In the example shown in the figure, <action> Service Stop </action> is described in a third line as the information indicating the "transmission command of the Service Start and Stop (stop) request message".

[Method of Stopping the Service when the Session Layer Protocol is the SCSI Protocol]

Next, a method of stopping the service when the SCSI protocol is used as the session layer protocol will be described.

FIG. 14 is a sequence diagram illustrating a Service Stop procedure from an initiator, when a session layer protocol is an SCSI protocol, and when the initiator is an SCSI initiator (service usage terminal), and a responder is an SCSI target (service providing terminal). In this case, when data transmission and reception is performed between the digital camera 1 and the PC 2, it is preferable that the PC 2 functions as the initiator and the digital camera 1 functions as the responder.

The initiator and the responder establish a communication connection (step S401). Specifically, as shown in FIG. 3, the initiator makes a connection request to the responder, and the responder allows the connection request.

If the communication connection between the initiator and the responder is established, the application layer of the initiator starts an SCSI initiator (step S402).

If the SCSI initiator is started, the application layer of the initiator requests the start of the service of the transport layer (step S403).

The transport layer of the initiator which receives the service start request transmits a "Get Service List" request message to the transport layer of the responder (step S404).

The transport layer of the responder which receives the "Get Service List" request message transmits a "Get Service List" response message in which service corresponding to the responder is set in the service parameter, to the transport layer of the initiator (step S405).

When service parameters in which the "Protocol Code" is "SCSI" and the "Class Code" is "SCSI Block Device—Target" are present in the "Get Service List" response message, the transport layer of the initiator which receives the "Get Service List" response message transmits the "Service Start and Stop (start)" request message to the transport layer of the responder in order to start the "SCSI Block Device—Target" (step S406).

The transport layer of the responder which receives the "Service Start and Stop (start)" request message requests the start of the SCSI protocol of the session layer of the responder (step S407).

The session layer of the responder which receives the start request of the SCSI protocol starts the SCSI protocol, and requests the start of the SCSI target of the application layer of the responder (step S408).

The application layer of the responder which receives the start request of the SCSI target starts the SCSI target (step S409).

The transport layer of the responder which requests the start of the SCSI protocol of the session layer of the responder transmits the "Service Start and Stop" response message to the transport layer of the initiator (step S410).

The transport layer of the initiator which receives the "Service Start and Stop" response message requests the start of the SCSI protocol of the session layer of the initiator (step S411).

The session layer of the initiator which receives the start request of the SCSI protocol starts the SCSI protocol (step S412).

After the session layer of the initiator starts the SCSI protocol, the application layer of the initiator inputs a read request to the session layer of the initiator in order to read data from a disk or the like of the SCSI target (step S413).

The session layer of the initiator to which the "READ" request is input generates a CDB (Command Descriptor Block) including a "READ" command (step S414). Subsequently, the session layer of the initiator transmits the generated CDB to the session layer of the responder, through the transport layers of the initiator and the responder.

The session layer of the responder obtains the "READ" command from the received CDB (step S415). Subsequently, the session layer of the responder inputs the obtained "READ" command to the application layer of the responder.

The application layer of the responder to which the "READ" command is input performs a read operation (read from a disk or the like) (step S416). Subsequently, the application layer of the responder inputs the read data to the session layer of the responder.

The session layer of the responder transmits the input read data to the session layer of the initiator, through the transport layers of the responder and the initiator (step S417).

The session layer of the initiator inputs the received read data to the application layer of the initiator (step S418).

The application layer of the initiator obtains the read data (step S419).

After the read operation is completed, the application layer of the responder inputs a "READ" response to the session layer of the responder in order to notify the completion of the read operation (step S420).

The session layer of the responder transmits the input "READ" response to the session layer of the initiator, through the transport layers of the responder and the initiator (step S421).

The session layer of the initiator inputs the received "READ" response to the application layer of the initiator (step S422).

The application layer of the initiator to which the "READ" response is input completes the read operation (step S423).

If the stop command of the service is input to the initiator from the user, the application layer of the initiator requests the Service Stop of the transport layer (step S424).

The transport layer of the initiator which receives the Service Stop request transmits the "Service Start and Stop (stop)" request message to the transport layer of the responder (step S425).

The transport layer of the responder which receives the "Service Start and Stop (stop)" request message requests the stop of the SCSI protocol of the session layer of the responder (step S426).

In the session layer of the responder the stop request of the SCSI protocol stops the SCSI protocol, and requests the stop of the SCSI target of the application of the responder (step S427).

The application layer of the responder which receives the stop request of the SCSI target stops the SCSI target (step S428).

The transport layer of the responder which requests the stop of the SCSI protocol of the session layer of the responder transmits the "Service Start and Stop" response message to the transport layer of the initiator (step S429).

The transport layer of the initiator which receives the "Service Start and Stop" response message requests the stop of the SCSI protocol of the session layer of the initiator (step S430).

The session layer of the initiator which receives the stop request of the SCSI protocol stops the SCSI protocol, and requests the stop of the SCSI initiator of the application layer of the initiator (step S431).

The session layer of the initiator which receives the stop request of the SCSI protocol stops the SCSI protocol, and requests the stop of the SCSI initiator of the application layer of the initiator (step S432).

Through the above-described procedure, when the session layer protocol is the SCSI protocol, the initiator is the SCSI initiator (service usage terminal), and the responder is the SCSI target (service providing terminal), it is possible to stop the service from the initiator side.

Figure 15:
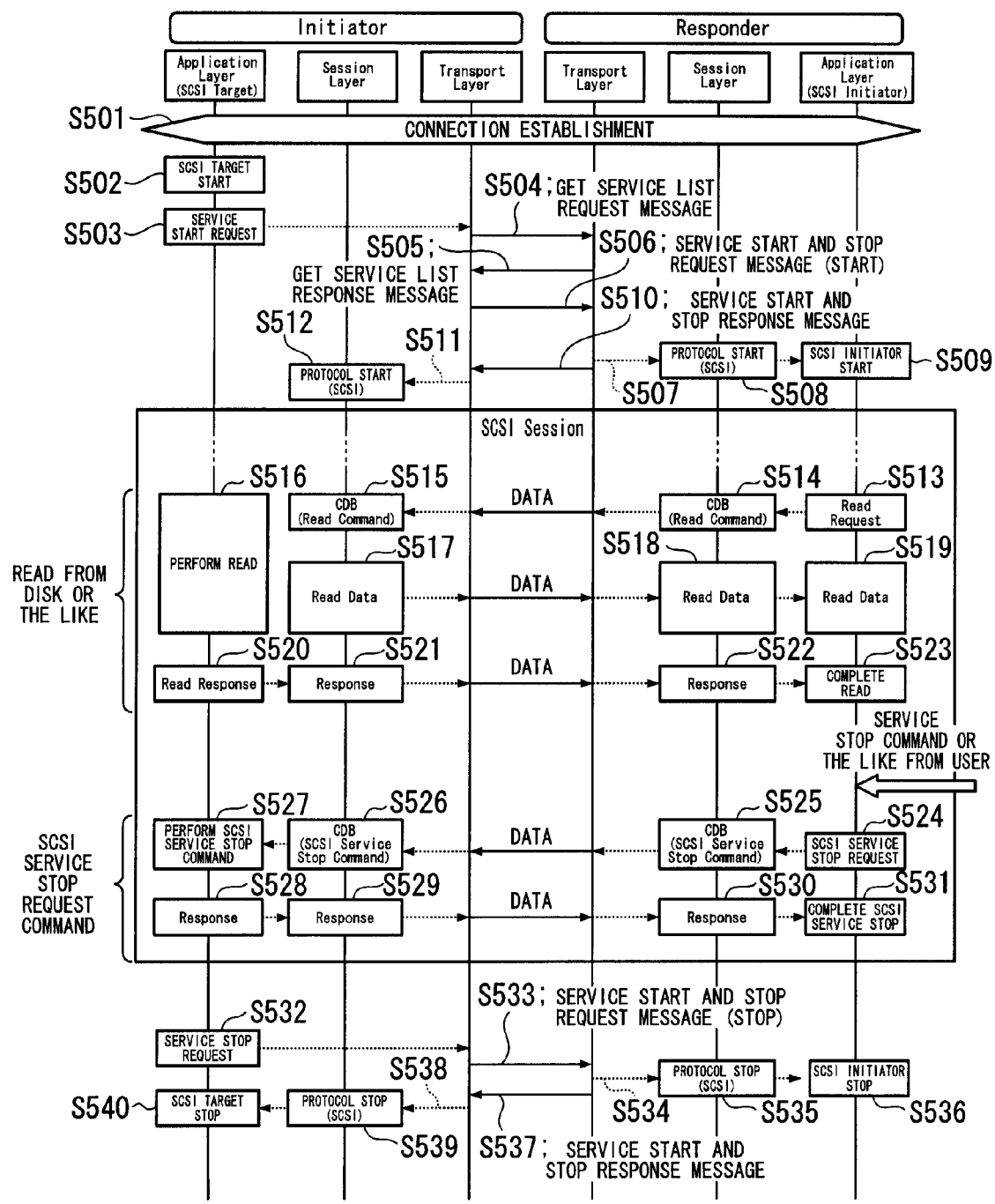
FIG. 15 is a sequence diagram illustrating a Service Stop procedure from a responder, when a session layer protocol is an SCSI protocol, an initiator is a server, and the responder is a client, according to the embodiment.

FIG. 15 is a sequence diagram illustrating a Service Stop procedure from the side of a responder, when a session layer protocol is an SCSI protocol, an initiator is an SCSI target (service providing terminal), and the responder is an SCSI initiator (service usage terminal). In this case, when data transmission and reception is performed between the digital camera 1 and the PC 2, it is preferable that the digital camera 1 functions as the initiator and the PC 2 functions as the responder.

A process in step S501 is the same as the process in step S401 in FIG. 14.

If the communication connection between the initiator and the responder is established, the application layer of the initiator starts the SCSI initiator (step S502).

If the SCSI target is started, the application layer of the initiator requests the start of the service of the transport layer (step S503).

The transport layer of the initiator which receives the service start request transmits a "Get Service List" request message to the transport layer of the responder (step S504).

The transport layer of the responder which receives the "Get Service List" request message transmits a "Get Service List" response message in which service corresponding to the responder is set in the service parameter, to the transport layer of the initiator (step S505).

When service parameters in which the "Protocol Code" is "SCSI" and the "Class Code" is "SCSI Block Device—Initiator" are present in the "Get Service List" response message, the transport layer of the initiator which receives the "Get Service List" response message transmits the "Service Start and Stop (start)" request message to the transport layer of the responder in order to start the "SCSI Block Device—Initiator" (step S506).

The transport layer of the responder which receives the "Service Start and Stop (start)" request message requests the start of the SCSI protocol of the session layer of the responder (step S507).

The session layer of the responder which receives the start request of the SCSI protocol starts the SCSI protocol, and requests the start of the SCSI initiator of the application layer of the responder (step S508).

The application layer of the responder which receives the start request of the SCSI initiator starts the SCSI initiator (step S509).

The transport layer of the responder which requests the start of the SCSI protocol of the session layer of the responder transmits the "Service Start and Stop" response message to the transport layer of the initiator (step S510).

The transport layer of the initiator which receives the "Service Start and Stop" response message requests the start of the SCSI protocol of the session layer of the initiator (step S511).

The session layer of the initiator which receives the start request of the SCSI protocol starts the SCSI protocol (step S512).

After the session layer of the responder starts the SCSI protocol, the application layer of the responder inputs a read request to the session layer of the responder, in order to read data from a disk or the like of the SCSI target (step S513).

The session layer of the responder to which the read request is input generates a CDB (Command Descriptor Block) including a "READ" command (step S514). Subsequently, the session layer of the responder transmits the generated CDB to the session layer of the initiator, through the transport layers of the responder and the initiator.

The session layer of the initiator obtains the "READ" command from the received CDB (step S515). Subsequently, the session layer of the initiator inputs the obtained "READ" command to the application layer of the initiator.

The application layer of the initiator to which the "READ" command is input performs the read operation (read data from a disk or the like) (step S516). Subsequently, the application layer of the initiator inputs the read data to the session layer of the initiator.

The session layer of the initiator transmits the input read data to the session layer of the responder, through the transport layers of the initiator and the responder (step S517).

The session layer of the responder inputs the received read data to the application layer of the responder (step S518).

The application layer of the responder obtains the read data (step S519).

After the read operation is completed, the application layer of the initiator inputs a "READ" response to the session layer of the initiator in order to notify the completion of the read operation (step S520).

The session layer of the initiator transmits the input "READ" response to the session layer of the responder, through the transport layers of the initiator and the responder (step S521).

The session layer of the responder inputs the received "READ" response to the application layer of the responder (step S522).

The application layer of the responder to which the "READ" response is input completes the read operation (step S523).

If the stop command of the service is input to the responder from the user, the application layer of the responder inputs an SCSI command ("SCSI Service Stop" command) indicating the "transmission command of the Service Start and Stop (stop) request message", to the session layer of the responder (step S524).

The session layer of the responder generates the CDB including the SCSI command indicating the "transmission command of the Service Start and Stop (stop) request message" (step S525). Subsequently, the session layer of the responder transmits the generated CDB to the session layer of the initiator, through the transport layers of the responder and the initiator.

The session layer of the initiator obtains the SCSI command indicating the "transmission command of the Service Start and Stop (stop) request message" from the received CDB (step S526). Subsequently, the session layer of the initiator inputs the SCSI command indicating the "transmission command of the Service Start and Stop (stop) request message", to the application layer of the initiator.

The application layer of the initiator to which the SCSI command indicating the "transmission command of the Service Start and Stop (stop) request message" is input performs the "SCSI Service Stop" command (step S527).

The application layer of the initiator inputs a response to the session layer of the initiator in order to notify that the "SCSI Service Stop" is performed (step S528).

The session layer of the initiator transmits the input response to the session layer of the responder, through the transport layers of the initiator and the responder (step S529).

The session layer of the responder inputs the received response to the application layer of the responder (step S530).

The application layer of the responder to which the response is input completes the stopping process of the SCSI service (step S531).

The application layer of the initiator which performs the stopping process of the SCSI service requests the stop of the service of the transport layer, when the SCSI command indicating the "transmission command of the Service Start and Stop (stop) request message" in step S527 is input (step S532).

Processes in steps S533 to S540 are the same as the processes in steps S425 to S432 in FIG. 14.

As described above, the SCSI initiator (Responder) issues the SCSI command indicating the "transmission command of the Service Start and Stop (stop) request message" to the SCSI target (initiator). Then, the SCSI target (initiator) which receives the SCSI command indicating the "transmission command of the Service Start and Stop (stop) request message" transmits the "Service Start and Stop (stop) request message" of the transport layer to the SCSI initiator (responder), and instructs the stop of the session layer protocol of the initiator (responder) and the SCSI initiator of the application layer.

Thus, when the session layer protocol is the SCSI protocol, the initiator is the SCSI target (service providing terminal), and the responder is the SCSI initiator (service usage terminal), it is possible to stop the service from the responder.

An example of the SCSI command indicting the "transmission command of the Service Start and Stop (stop) request message" is shown in FIG. 16. FIG. 16 is a diagram schematically illustrating a structure of data on CDB of an SCSI command indicating the "transmission command of the Service Start and Stop (stop) request message", in this embodiment. In the example shown in the figure, an operation code "0xD0" is stored in a zeroth byte of the CDB. In this embodiment, the CDB in which the operation code is "0xD0" is a CDB of the SCSI command indicating the "transmission command of the Service Start and Stop (stop) request message".

[A Method of Stopping the Service in a Case where the Session Layer Protocol is a PTP Protocol]

Next, a method of stopping the service in a case where the PTP protocol is used as the session layer protocol will be described.

Figure 17:
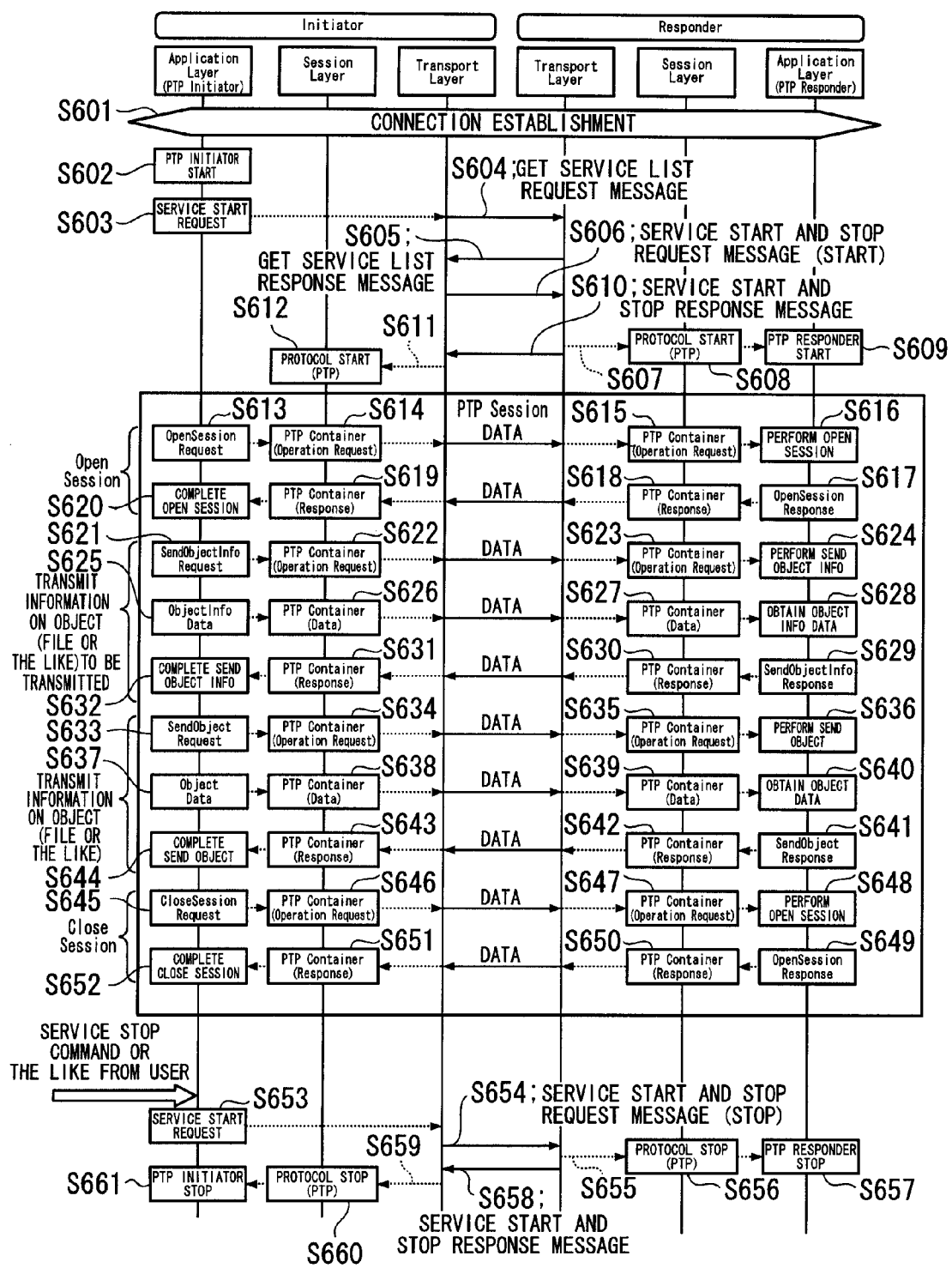
FIG. 17 is a sequence diagram illustrating a Service Stop procedure from an initiator, when a session layer protocol is a PTP protocol, the initiator is a PTP initiator, and a responder is a PTP responder, according to the embodiment.

FIG. 17 is a sequence diagram illustrating a Service Stop procedure from the side of an initiator, when a session layer protocol is a PTP protocol, the initiator is a PTP initiator (service usage terminal), and a responder is a PTP responder (service providing terminal). In this case, when data transmission and reception is performed between the digital camera 1 and the PC 2, it is preferable that the PC 2 functions as the initiator and the digital camera 1 functions as the responder.

The initiator and the responder establish communication connection (step S601). Specifically, as shown in FIG. 3, the initiator makes a connection request to the responder, and the responder allows the connection request.

If the communication connection between the initiator and the responder is established, the application layer of the initiator starts the PTP initiator (step S602).

If the PTP initiator is started, the application layer of the initiator requests the start of the service of the transport layer (step S603).

The transport layer of the initiator which receives the service start request transmits a "Get Service List" request message to the transport layer of the responder (step S604).

The transport layer of the responder which receives the "Get Service List" request message transmits a "Get Service List" response message in which service corresponding to the responder is set in the service parameter, to the transport layer of the initiator (step S605).

When service parameters in which the "Protocol Code" is "PTP" and the "Class Code" is "PTP Responder" are present in the "Get Service List" response message, the transport layer of the initiator which receives the "Get Service List" response message transmits the "Service Start and Stop (start)" request message to the transport layer of the responder in order to start the "PTP Responder" (step S606).

The transport layer of the responder which receives the "Service Start and Stop (start)" request message requests the start of the PTP protocol of the session layer of the responder (step S607).

The session layer of the responder which receives the start request of the PTP protocol starts the PTP protocol, and requests the start of the PTP responder of the application layer of the responder (step S608).

The application layer of the responder which receives the start request of the PTP responder starts the PTP responder (step S609).

The transport layer of the responder which requests the start of the PTP protocol of the session layer of the responder transmits the "Service Start and Stop" response message to the transport layer of the initiator (step S610).

The transport layer of the initiator which receives the "Service Start and Stop" response message requests the start of the PTP protocol of the session layer of the initiator (step S611).

The session layer of the initiator which receives the start request of the PTP protocol starts the PTP protocol (step S612).

After the session layer of the initiator starts the PTP protocol, the application layer of the initiator inputs an "Open Session" request to the session layer of the initiator (step S613).

The session layer of the initiator stores the input "Open Session" request in a PTP container (operation request) (step S614). Subsequently, the session layer of the initiator transmits the PTP container (operation request) to the session layer of the responder, through the transport layers of the initiator and the responder.

The session layer of the responder obtains the "Open Session" request from the received PTP container (operation request) (step S615). Subsequently, the session layer of the responder inputs the obtained "Open Session" request to the application layer of the responder.

The application layer of the responder to which the "Open Session" request is input performs the "Open Session" (step S616).

The application layer of the responder inputs an "Open Session" response to the session layer of the responder, in order to notify that the "Open Session" has been performed (step S617).

The session layer of the responder to which the "Open Session" response is input stores the input "Open Session" response in the PTP container (response) (step S618). Subsequently, the session layer of the responder transmits the PTP container (response) to the session layer of the initiator, through the transport layers of the responder and the initiator.

The session layer of the initiator obtains the "Open Session" response from the received PTP container (response) (step S619). Subsequently, the session layer of the initiator inputs the obtained "Open Session" response to the application layer of the initiator.

The application layer of the initiator to which the "Open Session" response is input completes the "Open Session" (step S620).

After the "Open Session" is completed, the application layer of the initiator inputs a "Send Object Info" request which is a command of starting transmission of information on an object (file or the like) which is a transmission target (file or the like), to the session layer of the initiator (step S621).

The session layer of the initiator stores the input "Send Object Info" request in the PTP container (operation request) (step S622). Subsequently, the session layer of the initiator transmits the PTP container (operation request) to the session layer of the responder, through the transport layers of the initiator and the responder.

The session layer of the responder obtains the "Send Object Info" request from the received PTP container (operation request) (step S623). Subsequently, the session layer of the responder inputs the obtained "Send Object Info" request to the application layer of the responder.

The application layer of the responder to which the "Send Object Info" request is input performs the "Send Object Info" (step S624).

If the application layer of the initiator inputs "Object Info" data including information on the object (file or the like) which is the transmission target, to the session layer of the initiator (step S625).

The session layer of the initiator stores the input "Object Info" data in the PTP container (data) (step S626). Subsequently, the session layer of the initiator transmits the PTP container (data) to the session layer of the responder, through the transport layers of the initiator and the responder.

The session layer of the responder obtains the "Object Info" data from the received PTP container (data) (step S627). Subsequently, the session layer of the responder inputs the obtained "Object Info" data to the application layer of the responder.

The application layer of the responder to which the "Object Info" data is input obtains the "Object Info" data (step S628).

The application layer of the responder inputs the "Send Object Info" response to the session layer of the responder, in order to notify that the "Object Info" data has been obtained (step S629).

The session layer of the responder stores the input "Send Object Info" response in the PTP container (response) (step S630). Subsequently, the session layer of the responder transmits the PTP container (response) to the session layer of the initiator, through the transport layers of the responder and the initiator.

The session layer of the initiator obtains the "Send Object Info" response from the received PTP container (response) (step S631). Subsequently, the session layer of the initiator inputs the obtained "Send Object Info" response to the application layer of the initiator.

The application layer of the initiator to which the "Send Object Info" response is input" is input completes the "Send Object Info" (step S632).

After the "Send Object Info" is completed, the application layer of the initiator inputs the "Send Object" request which is the command for starting the transmission of the object (file or the like) which is the transmission target, to the session layer of the initiator (step S633).

The session layer of the initiator stores the input "Send Object" request in the PTP container (operation request) (step S634). Subsequently, the session layer of the initiator transmits the PTP container (operation request) to the session layer of the responder, through the transport layers of the initiator and the responder.

The session layer of the responder obtains the "Send Object" request from the received PTP container (operation request) (step S635). Subsequently, the session layer of the responder inputs the obtained "Send Object" request to the application layer of the response (step S635).

The application layer of the responder to which the "Send Object" request is input performs the "Send Object" (step S636).

The application layer of the initiator inputs the "Object" data including the object (file or the like) which is the transmission target, to the session layer of the initiator (step S637).

The session layer of the initiator stores the input "Object" data in the PTP container (data) (step S638). Subsequently, the session layer of the initiator transmits the PTP container (data) to the session layer of the responder, through the transport layers of the initiator and the responder.

The session layer of the responder obtains the "Object" data from the received PTP container (data) (step S639).

Subsequently, the session layer of the responder inputs the obtained "Object" data to the application layer of the responder.

The application layer of the responder to which the "Object" data is input obtains the "Object" data (step S640).

The application layer of the responder inputs the "Send Object" response to the session layer of the responder, in order to notify that the "Object" data has been obtained (step S641).

The session layer of the responder stores the input "Send Object" response in the PTP container (response) (step S642). Subsequently, the session layer of the responder transmits the PTP container (response) to the session layer of the initiator, through the transport layers of the responder and the initiator.

The session layer of the initiator obtains the "Send Object" response from the received PTP container (response) (step S643). Subsequently, the session layer of the initiator inputs the obtained "Send Object" response to the application layer of the initiator.

The application layer of the initiator to which the "Send Object" response is input completes the "Send Object" (step S644).

After the "Send Object" is completed, the application layer of the initiator inputs a "Close Session" request to the session layer of the initiator (step S645).

The session layer of the initiator stores the input "Close Session" request in the PTP container (operation request) (step S646). Subsequently, the session layer of the initiator transmits the PTP container (operation request) to the session layer of the responder, through the transport layers of the initiator and the responder.

The session layer of the responder obtains the "Close Session" request from the received PTP container (operation request) (step S647). Subsequently, the session layer of the responder inputs the obtained "Close Session" request to the application layer of the responder.

The application layer of the responder to which the "Close Session" request is input performs the "Close Session" (step S648).

The application layer of the responder inputs the "Close Session" response to the session layer of the responder, in order to notify that the "Close Session" is performed (step S649).

The session layer of the responder to which the "Close Session" response is input stores the input "Close Session" response in the PTP container (response) (step S650). Subsequently, the session layer of the responder transmits the PTP container (response) to the session layer of the initiator, through the transport layers of the responder and the initiator.

The session layer of the initiator obtains the "Close Session" response from the received PTP container (response) (step S651). Subsequently, the session layer of the initiator inputs the obtained "Close Session" response to the application layer of the initiator.

The application layer of the initiator to which the "Close Session" response is input completes the "Close Session" (step S652).

If the stop command of the service is input to the initiator from the user, the application layer of the initiator requests the Service Stop of the transport layer (step S653).

The transport layer of the initiator which receives the Service Stop request transmits the "Service Start and Stop (stop)" request message to the transport layer of the responder (step S654).

The transport layer of the responder which receives the "Service Start and Stop (stop)" request message requests the stop of the PTP protocol of the session layer of the responder (step S655).

The Session layer of the responder which receives the stop of the PTP protocol stops the PTP protocol, and requests the stop of the PTP responder of the application layer of the responder (step S656).

The application layer of the responder which receives the stop request of the PTP responder stops the PTP responder (step S657).

The transport layer of the responder which requests the stop of the PTP protocol of the session layer of the responder transmits the "Service Start and Stop" response message to the transport layer of the initiator (step S658).

The transport layer of the initiator which receives the "Service Start and Stop" response message requests the stop of the PTP protocol of the session layer of the initiator (step S659).

The session layer of the initiator which receives the stop request of the PTP protocol stops the PTP protocol, and requests the stop of the PTP initiator of the application layer of the initiator (step S660).

The application layer of the initiator which receives the stop request of the PTP initiator stops the PTP initiator (step S661).

Through the above-described procedure, when the session layer protocol is the PTP protocol, the initiator is the PTP initiator (service usage terminal), and the responder is the PTP responder (service providing terminal), the application layer of the initiator can stop the service from the initiator.

Figure 18:
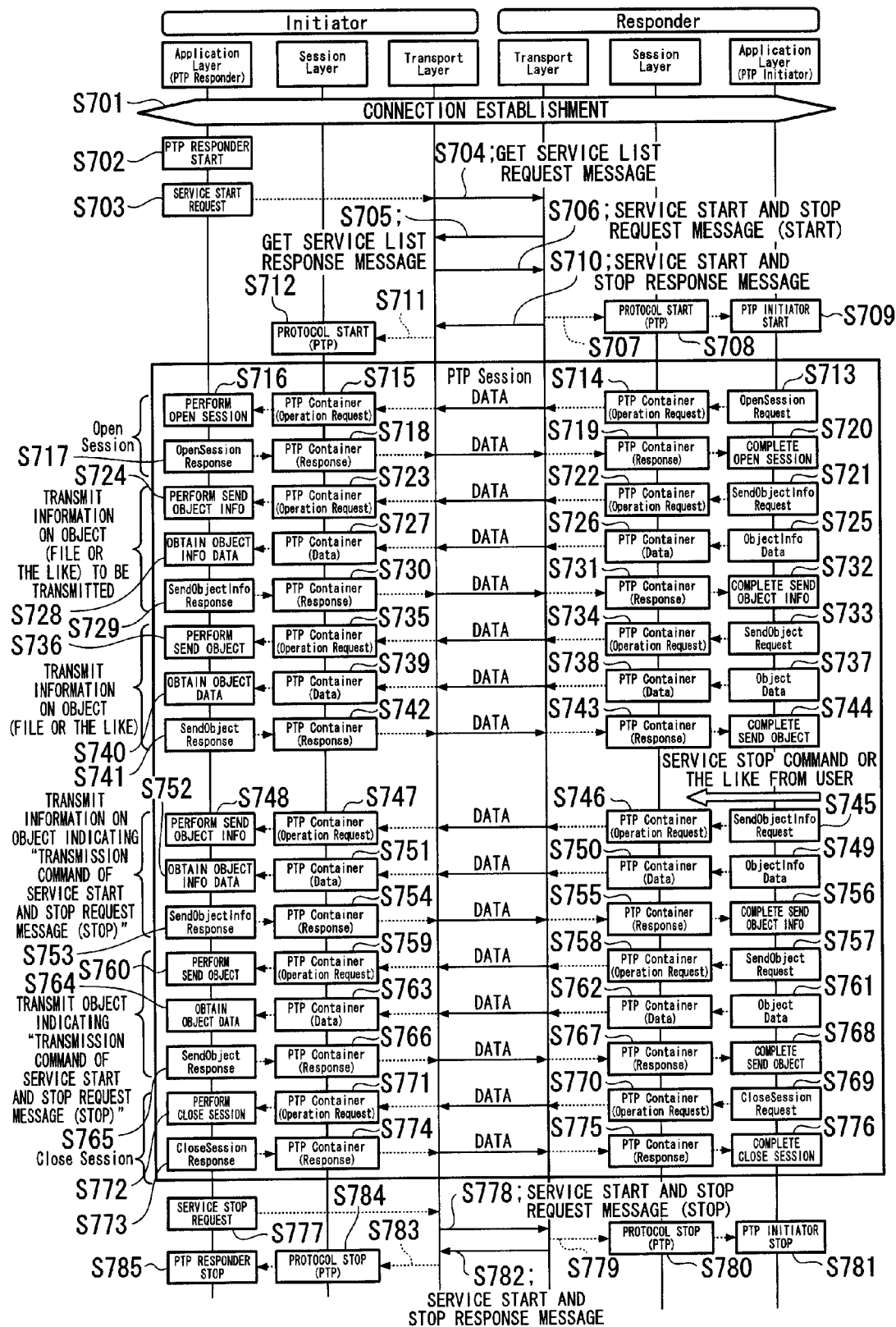
FIG. 18 is a sequence diagram illustrating a Service Stop procedure from a responder when "Object" data is used, in a case where a session layer protocol is a PTP protocol, an initiator is a PTP responder, and the responder is a PTP initiator, according to the embodiment.

FIG. 18 is a sequence diagram illustrating a Service Stop procedure from a responder when "Object" data is used, and when a session layer protocol is a PTP protocol, an initiator is a PTP responder (service providing terminal), and the responder is a PTP initiator (service usage terminal). In this case, when data transmission and reception is performed between the digital camera 1 and the PC 2, it is preferable that the digital camera 1 functions as the initiator and the PC 2 functions as the responder.

A process in step S701 is the same as the process in step S601 in FIG. 17.

If the communication connection between the initiator and the responder is established, the application layer of the initiator starts the PTP responder (step S702).

If the PTP responder is started, the application layer of the initiator requests the start of the service of the transport layer (step S703).

The transport layer of the initiator which receives the service start request transmits a "Get Service List" request message to the transport layer of the responder (step S704).

The transport layer of the responder which receives the "Get Service List" request message transmits a "Get Service List" response message in which service corresponding to the responder is set in the service parameter, to the transport layer of the initiator (step S705).

When service parameters in which the "Protocol Code" is "PTP" and the "Class Code" is "PTP initiator" are present in the "Get Service List" response message, the transport layer of the initiator which receives the "Get Service List" response message transmits the "Service Start and Stop (start)" request message to the transport layer of the responder, in order to start the "PTP initiator" (step S706).

The transport layer of the responder which receives the "Service Start and Stop (start)" request message requests the start of the PTP protocol of the session layer of the responder (step S707).

The session layer of the responder which receives the start request of the PTP protocol starts the PTP protocol, and requests the start of the PTP initiator of the application layer of the responder (step S708).

The application layer of the responder which receives the start request of the PTP initiator starts the PTP initiator (step S709).

The transport layer of the responder which requests the start of the PTP protocol of the session layer of the responder transmits the "Service Start and Stop" response message to the transport layer of the initiator (step S710).

The transport layer of the initiator which receives the "Service Start and Stop" response message requests the start of the PTP protocol of the session layer of the initiator (step S711).

The session layer of the initiator which receives the start request of the PTP protocol starts the PTP protocol (step S712).

After the session layer of the responder starts the PTP protocol, the application layer of the responder inputs an "Open Session" request to the session layer of the responder (step S713).

The session layer of the responder stores the input "Open Session" request in a PTP container (operation request) (step S714). Subsequently, the session layer of the responder transmits the PTP container (operation request) to the session layer of the initiator, through the transport layers of the responder and the initiator.

The session layer of the initiator obtains the "Open Session" request from the received PTP container (operation request) (step S715). Subsequently, the session layer of the initiator inputs the obtained "Open Session" request to the application layer of the initiator.

The application layer of the initiator to which the "Open Session" request is input performs the "Open Session" (step S716).

The application layer of the initiator inputs the "Open Session" response to the session layer of the initiator, in order to notify that the "Open Session" is performed (step S717).

The session layer of the initiator to which the "Open Session" response is input stores the input "Open Session" response in the PTP container (response) (step S718). Subsequently, the session layer of the initiator transmits the PTP container (response) to the session layer of the responder, through the transport layers of the initiator and the responder.

The session layer of the responder obtains the "Open Session" response from the received PTP container (response) (step S719). Subsequently, the session layer of the responder inputs the obtained "Open Session" response to the application layer of the responder.

The application layer of the responder to which the "Open Session" response is input completes the "Open Session" (step S720).

After the "Open Session" is completed, the application layer of the responder inputs a "Send Object Info" request which is a command for starting transmission of information on an object (file or the like) which is a transmission target, to the session layer of the responder (step S721).

The session layer of the responder stores the input "Send Object Info" request in the PTP container (operation request) (step S722). Subsequently, the session layer of the responder transmits the PTP container (operation request) to the session layer of the initiator, through the transport layers of the responder and the initiator.

The session layer of the initiator obtains the "Send Object Info" request from the received PTP container (operation request) (step S723). Subsequently, the session layer of the initiator inputs the obtained "Send Object Info" request to the application layer of the initiator.

The application layer of the initiator to which the "Send Object Info" request is input performs the "Send Object Info" (step S724).

If the application layer of the responder inputs "Object Info" data including information on the object (file or the like) which is the transmission target, to the session layer of the responder (step S725).

The session layer of the responder stores the input "Object Info" data in the PTP container (data) (step S726). Subsequently, the session layer of the responder transmits the PTP container (data) to the session layer of the initiator, through the transport layers of the responder and the initiator.

The session layer of the initiator obtains the "Object Info" data from the received PTP container (data) (step S727). Subsequently, the session layer of the initiator inputs the obtained "Object Info" data to the application layer of the initiator.

The application layer of the initiator to which the "Object Info" data is input obtains the "Object Info" data (step S728).

The application layer of the initiator inputs the "Send Object Info" response to the session layer of the initiator, in order to notify that the "Object Info" data has been obtained (step S729).

The session layer of the initiator stores the input "Send Object Info" response in the PTP container (response) (step S730). Subsequently, the session layer of the initiator transmits the PTP container (response) to the session layer of the responder, through the transport layers of the initiator and the responder.

The session layer of the responder obtains the "Send Object Info" response from the received PTP container (response) (step S731). Subsequently, the session layer of the responder inputs the obtained "Send Object Info" response to the application layer of the responder.

The application layer of the responder to which the "Send Object Info" response is input completes the "Send Object Info" (step S732).

After the "Send Object Info" is completed, the application layer of the responder inputs the "Send Object" request which is the command for starting the transmission of the object (file or the like) which is the transmission target, to the session layer of the responder (step S733).

The session layer of the responder stores the input "Send Oject" request in the PTP container (operation request) (step S734). Subsequently, the session layer of the responder transmits the PTP container (operation request) to the session layer of the initiator, through the transport layers of the responder and the initiator.

The session layer of the initiator obtains the "Send Object" request from the received PTP container (operation request) (step S735). Subsequently, the session layer of the initiator inputs the obtained "Send Object" request to the application layer of the initiator.

The application layer of the initiator to which the "Send Object" request is input performs the "Send Object" (step S736).

The application layer of the responder inputs the "Object" data including the object (file or the like) which is the transmission target, to the session layer of the responder (step S737).

The session layer of the responder stores the input "Object" data in the PTP container (data) (step S738). Subsequently, the session layer of the responder transmits the PTP container (data) to the session layer of the initiator, through the transport layers of the responder and the initiator.

The session layer of the initiator obtains the "Object" data from the received PTP container (data) (step S739). Subsequently, the session layer of the initiator inputs the obtained "Object" data to the application layer of the initiator.

The application layer of the initiator to which the "Object" data is input obtains the object data (step S740).

The application layer of the initiator inputs the "Send Object" response to the session layer of the initiator, in order to notify that the "Object" data has been obtained (step S741).

The session layer of the initiator stores the input "Send Object" response in the PTP container (response) (step S742). Subsequently, the session layer of the initiator transmits the PTP container (response) to the session layer of the responder, through the transport layers of the initiator and the responder.

The session layer of the responder obtains the "Send Object" response from the received PTP container (response) (step S743). Subsequently, the session layer of the responder inputs the obtained "Send Object" response to the application layer of the responder.

The application layer of the responder to which the "Send Object" response is input completes the Send Object (step S744).

If the stop command of the service is input to the responder by the user, the application layer of the responder inputs the "Send Object Info" request which is the command for starting the transmission of information on the "Object" indicating the "transmission command of the Service Start and Stop (stop) request message" to the session layer of the responder (step S745).

The session layer of the responder stores the input "Send Object Info" request in the PTP container (operation request) (step S746). Subsequently, the session layer of the responder transmits the PTP container (operation request) to the session layer of the initiator, through the transport layers of the responder and the initiator.

The session layer of the initiator obtains the "Send Object Info" request from the received PTP container (operation request) (step S747). Subsequently, the session layer of the initiator inputs the obtained "Send Object Info" request to the application layer of the initiator.

The application layer of the initiator to which the "Send Object Info" request is input performs the "Send Object Info" (step S748).

The application layer of the responder inputs the "Object Info" data including the information on the object indicating the "transmission command of the Service Start and Stop (stop) request message", to the session layer of the responder (step S749).

The session layer of the responder stores the input "Object Info" data in the PTP container (data) (step S750). Subsequently, the session layer of the responder transmits the PTP container (data) to the session layer of the initiator, through the transport layers of the responder and the initiator.

The session layer of the initiator obtains the "Object Info" data from the received PTP container (data) (step S751). Subsequently, the session layer of the initiator inputs the obtained "Object Info" data to the application layer of the initiator.

The application layer of the initiator to which the "Object Info" data is input obtains the "Object Info" data including the information on the object indicating the "transmission command of the Service Start and Stop (stop) request message" (step S752).

The application layer of the initiator inputs the "Send Object Info" response to the session layer of the initiator, in order to notify that the "Object Info" data has been obtained (step S753).

The session layer of the initiator stores the input "Send Object Info" response in the PTP container (response) (step S754). Subsequently, the session layer of the initiator transmits the PTP container (response) to the session layer of the responder, through the transport layers of the initiator and the responder.

The session layer of the responder obtains the "Send Object Info" response from the received PTP container (response) (step S755). Subsequently, the session layer of the responder inputs the obtained "Send Object Info" response to the application layer of the responder.

The application layer of the responder in which the "Send Object Info" response is input completes the "Send Object Info" (step S756).

After the Send Object Info is completed, the application layer of the responder inputs the "Send Object" request which is the command for starting the transmission of the object indicating the "transmission command of the Service Start and Stop (stop) request message", to the session layer of the responder (step S757).

The session layer of the responder stores the input "Send Object" request in the PTP container (operation request) (step S758). Subsequently, the session layer of the responder transmits the PTP container (operation request) to the session layer of the initiator, through the transport layers of the responder and the initiator.

The session layer of the initiator obtains the "Send Object" request from the received PTP container (operation request) (step S759). Subsequently, the session layer of the initiator inputs the obtained "Send Object" request to the application layer of the initiator.

The application layer of the initiator in which the "Send Object" request is input performs the "Send Object" (step S760).

The application layer of the responder inputs the "Object" data including the object indicating the "transmission command of the Service Start and Stop (stop) request message" to the session layer of the responder (step S761).

The session layer of the responder stores the input "Object" data in the PTP container (data) (step S762). Subsequently, the session layer of the responder transmits the PTP container (data) to the session layer of the initiator, through the transport layers of the responder and the initiator.

The session layer of the initiator obtains the "Object" data from the received PTP container (data) (step S763). Subsequently, the session layer of the initiator inputs the obtained "Object" data in the application layer of the initiator.

The application layer of the initiator to which the "Object" data is input obtains the "Object" data including the object indicating the "transmission command of the Service Start and Stop (stop) request message" (step S764).

The application layer of the initiator inputs the "Send Object" response to the session layer of the initiator, in order to notify that the "Object" data including the object indicating the "transmission command of the Service Start and Stop (stop) request message" has been obtained (step S765).

The session layer of the initiator stores the input "Send Object" response in the PTP container (response) (step S766). Subsequently, the session layer of the initiator transmits the PTP container (response) to the session layer of the responder, through the transport layers of the initiator and the responder.

The session layer of the responder obtains the "Send Object" response from the received PTP container (response) (step S767). Subsequently, the session layer of the responder inputs the obtained "Send Object" response to the application layer of the responder.

The application layer of the responder to which the "Send Object" response is input completes the "Send Object" (step S768).

After the Send Object is completed, the application layer of the responder inputs a "Close Session" request to the session layer of the responder (step S769).

The session layer of the responder stores the input "Close Session" request in the PTP container (operation request) (step S770). Subsequently, the session layer of the responder transmits the PTP container (operation request) to the session layer of the initiator, through the transport layers of the responder and the initiator.

The session layer of the initiator obtains the "Close Session" request from the received PTP container (operation request) (step S771). Subsequently, the session layer of the initiator inputs the obtained "Close Session" request to the application layer of the initiator.

The application layer of the initiator to which the "Close Session" request is input performs the "Close Session" (step S772).

The application layer of the initiator inputs the "Close Session" response to the session layer of the initiator in order to notify that the "Close Session" is performed (step S773).

The session layer of the initiator to which the "Close Session" response is input stores the input "Close Session" response in the PTP container (response) (step S774). Subsequently, the session layer of the initiator transmits the PTP container (response) to the session layer of the responder, through the transport layers of the initiator and the responder.

The session layer of the responder obtains the "Close Session" response from the received PTP container (response) (step S775). Subsequently, the session layer of the responder inputs the obtained "Close Session" response to the application layer of the responder.

The application layer of the responder to which the "Close Session" response is input completes the "Close Session" (step S776).

After the "Close Session" is performed, the application layer of the initiator requests the stop of the service of the transport layer, when the "Object" obtained in step S764 is the "Object" indicating the "transmission command of the Service Start and Stop (stop) request message" (step S777).

The transport layer of the initiator which receives the Service Stop request transmits the "Service Start and Stop (stop)" request message to the transport layer of the responder (step S778).

The transport layer of the responder which transmits the "Service Start and Stop (stop)" request message request the stop of the PTP protocol of the session layer of the responder (step S779).

The session layer of the responder which receives the stop request of the PTP protocol stops the PTP protocol, and requests the stop of the PTP initiator of the application layer of the response (step S780).

The application layer of the responder which receives the stop request of the PTP initiator stops the PTP initiator (step S781).

The transport layer of the responder which requests the stop of the PTP protocol of the session layer of the responder transmits the "Service Start and Stop" response message to the transport layer of the initiator (step S782).

The transport layer of the initiator which receives the "Service Start and Stop" response message requests the stop of the PTP protocol of the session layer of the initiator (step S783).

The session layer of the initiator which receives the stop request of the PTP protocol stops the PTP protocol, and requests the stop of the PTP protocol of the application layer of the initiator (step S784).

The application layer of the initiator which receives the stop request of the PTP responder stops the PTP responder (step S785).

As described above, in a case where the service is stopped from the PTP initiator (service usage terminal), the PTP initiator (service usage terminal) transmits the object indicting the "transmission command of the Service Start and Stop (stop) request message" to the PTP responder (service providing terminal).

A procedure of the object transmission in the PTP is as follows.

Step 1) In the "Send Object Info" operation, information on an "Object" to be transmitted (Object Info) is transmitted. The "Object Info" includes an object format type (object format field) such as JPEG, TIFF or the like, or a capture date (capture date field), in addition to a file name (file name field).

Step 2) A substance of the "Object" is transmitted in the "Send Object" operation.

Then, after the "Close Session" (transmission and reception of the "Close Session request/response") is completed, the PTP responder (service providing terminal) which receives the object "transmission command of the Service Start and Stop (stop) request message" transmits the "Service Start and Stop (stop)" request message of the transport layer to the PTP initiator (service usage terminal), and instructs the stop of the session layer protocol of the PTP initiator side (service usage terminal) and the PTP initiator of the application layer.

Thus, when the session layer protocol is the PTP protocol, the initiator is the PTP responder (service providing terminal), and the responder is the PTP initiator (service usage terminal), it is possible to stop the service from the responder side using the object data.

In the above-described example, after the "Close Session" request is received, the PTP responder (service providing terminal) transmits the "Service Start and Stop (stop)" request message, but the PTP responder (service providing terminal) may transmit the "Service Start and Stop (stop)" request message before the "Close Session" request is received.

Further, in the above-described example, an example in which the "Close Session" (steps S769 to S776) is performed is exemplified, but the "Close Session" may not be performed. Specifically, after the processes (steps S757 to S768) which receive the object indicating the "transmission command of the Service Start and Stop (stop)" request message are performed, the PTP responder (service providing terminal) may perform the Service Stopping processes (steps S777 to S785) by requesting the Service Stop. In this way, even though there is no "Close Session", the PTP responder (service providing terminal) can issue the Service Stop request.

Further, an example of an object indicating the "transmission command of the Service Start and Stop" request message is as follows.

An object in which an object name (for example, "SRVSTOP.SCR") indicating the "transmission command of the Service Start and Stop (stop) request message" is set in the "file name" field of the "Object Info" transmitted in the "Send Object Info" operation An object which is described by a structured language (XML) and describes information indicating the "transmission command of the Service Start and Stop (stop) request message" (for example, see FIG. 13)

Figure 19:
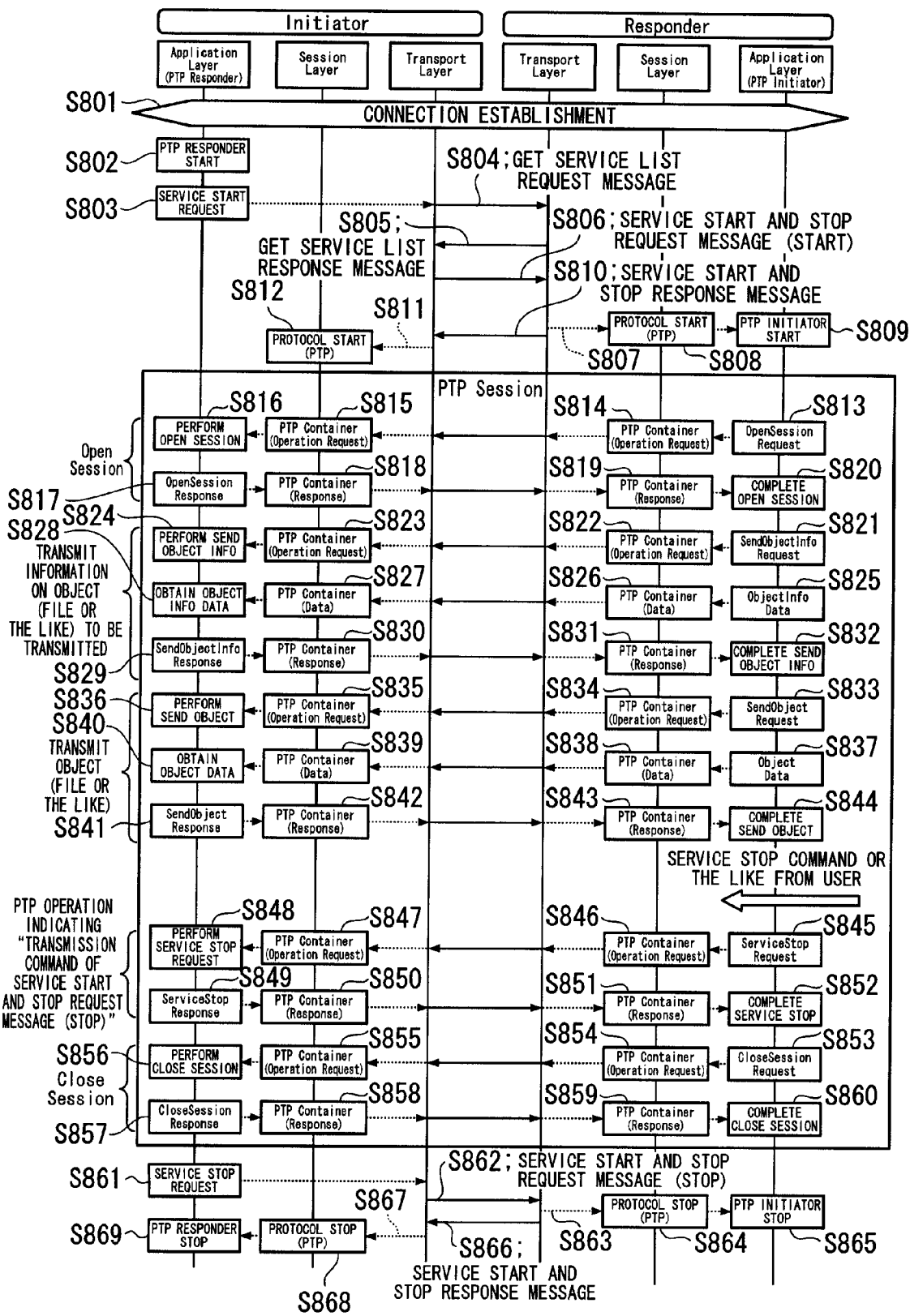
FIG. 19 is a sequence diagram illustrating a Service Stop procedure from a responder when a PTP operation ("Service Stop") is used, a session layer protocol is a PTP protocol, an initiator is a PTP responder, and the responder is a PTP initiator, according to the embodiment.

FIG. 19 is a sequence diagram illustrating a Service Stop procedure from a responder in a case where the PTP operation ("Service Stop") is used, when a session layer protocol is a PTP protocol, an initiator is a PTP responder (service providing terminal), and the responder is a PTP initiator (service usage terminal). In this case, when the transmission and reception is performed between the digital camera 1 and the PC 2, it is preferable that the digital camera 1 functions as the initiator and the PC 2 functions as the responder.

Processes in steps S801 to S844 are the same as the processes in steps S701 to S744 in FIG. 18. Accordingly, description of the processes in steps S801 to S844 will be omitted.

If the stop command of the service is input to the responder from the user, the application layer of the responder inputs the "Service Stop" request which is the PTP operation indicating the "transmission command of the Service Start and Stop (stop) request message" to the session layer of the responder (step S845).

The session layer of the responder stores the input "Service Stop" request in the PTP container (operation request) (step S846). Subsequently, the session layer of the responder transmits the PTP container (operation request) to the session layer of the initiator, through the transport layers of the responder and the initiator.

The session layer of the initiator obtains the "Service Stop" request from the received PTP container (operation request) (step S847). Subsequently, the session layer of the initiator inputs the obtained "Service Stop" request to the application layer of the initiator.

The application layer of the initiator to which the "Service Stop" request is input performs the "Service Stop" request (step S848).

The application layer of the initiator inputs the "Service Stop" response to the session layer of the initiator, in order to notify that the "Service Stop" has been performed (step S849).

The session layer of the initiator stores the input "Service Stop" response in the PTP container (response) (step S850). Subsequently, the session layer of the initiator transmits the PTP container (response) to the session layer of the responder, through the transport layers of the initiator and the responder.

The session layer of the responder obtains the "Service Stop" response from the received PTP container (response) (step S851). Subsequently, the session layer of the responder inputs the obtained "Service Stop" response to the application layer of the responder.

The application layer of the responder to which the "Service Stop" response is input completes the "Service Stop" (step S852).

After the "Service Stop" is completed, the application layer of the responder inputs the "Close Session" request to the session layer of the responder (step S853).

Processes in steps S854 to S860 are the same as the processes in steps S770 to S776 in FIG. 18. Accordingly, description of the processes in steps S854 to S860 will be omitted.

After the "Close Session" is performed, the application layer of the initiator requests the Service Stop of the transport layer, when the "Service Stop" request which is the PTP operation indicating the "transmission command of the Service Start and Stop (stop) request message" in step S848 is input (step S861).

Processes in steps S862 to S869 are the same as the processes in steps S778 to S785 in FIG. 18. Accordingly, description of the processes in steps S862 to S869 will be omitted.

As described above, when the service is stopped from the PTP initiator (service usage terminal), the PTP initiator (service usage terminal) issues the PTP operation ("Service Stop" request) indicating the "transmission command of the Service Start and Stop (stop) request message" to the PTP responder (service providing terminal).

Further, the PTP responder (service providing terminal) which receives the PTP operation indicating the "transmission command of the Service Start and Stop (stop) request message" transmits the "Service Start and Stop (stop)" request message of the transport layer to the PTP initiator (service usage terminal), and instructs the stop of the session layer protocol of the PTP initiator (service usage terminal) side and the PTP initiator of the application layer.

Thus, when the session layer protocol is the PTP protocol, the initiator is the PTP responder (service providing terminal), and the responder is the PTP initiator (service usage terminal), it is possible to stop the service from the responder using the PTP operation indicating the "transmission command of the Service Start and Stop (stop) request message".

In the above-described example, after the "Close Session" request is received, the PTP responder (service providing terminal) transmits the "Service Start and Stop (stop)" request message, but the PTP responder (service providing terminal) may transmit the "Service Start and Stop (stop)" request message before the "Close Session" request is received.

Further, in the above-described example, an example in which the "Close Session" (steps S853 to S860) is performed is exemplified, but the "Close Session" may not be performed. Specifically, after the processes (steps S845 to S852) which perform the PTP operation indicating the "transmission command of the Service Start and Stop (stop) request message" are performed, the PTP responder (service providing terminal) may perform the Service Stopping processes (steps S861 to S869) by requesting the Service Stop. In this way, even though there is no "Close Session", the PTP responder (service providing terminal) can output the Service Stop request.

Further, an example of the PTP operation indicating the "transmission command of the Service Start and Stop request message" is shown in FIG. 20. FIG. 20 is a diagram schematically illustrating a structure of data on the PTP operation indicating the "transmission command of the Service Start and Stop (stop) request message" in this embodiment. In the example shown in the figure, the PTP operation includes six fields of an "operation code" and "parameter 1 to parameter 5". A "Service Stop (0x9000)" is stored in the field "operation code". Further, operation parameters are stored in the fields 37 parameter 1 to parameter 5". In this embodiment, the PTP operation in which the operation code is "Service Stop (0x9000)" is a PTP operation indicating the "transmission command of the Service Start and Stop (stop) request message". In the PTP operation indicating the "transmission command of the Service Start and Stop (stop) request message", the "parameter 1 to parameter 5" is not used.

Hereinbefore, one embodiment of the invention has been described in detail with reference to the drawings, but the specific configuration is not limited thereto; but can be variously modified within the scope without departing from the gist of the present invention.

When a master-slave type transport layer protocol which functions as initiator/responder or host/device in a transport layer is employed in a client/server type application in the related art, if the responder/device is allocated to the client and the initiator/host is allocated to the server, since the service in the application layer, and/or the stop control of the session layer protocol (OBEX/SCSI/PTP or the like) can be performed only from the initiator/host, even though it is desirable that the client side terminate the usage of the service provided by the server, it is not possible to perform the service through the communication of the transport layer or the stop control of the session layer protocol, which causes unnecessary power consumption.

In order to solve the above-described problems, in the invention, the receiving section of the service usage terminal receives communication data on the transport layer from the service providing terminal which provides the service of the higher layer than the transport layer. When the communication data of the transport layer received by the receiving section relates to the stop request of the service, the control section performs the stopping processing of the session layer protocol relating to the service. The trigger receiving section receives a trigger relating to the stop of the service. When the trigger receiving section receives the trigger, the transmitting section transmits the communication data of the higher layer relating to the stop request of the service to the service providing terminal.

Accordingly, according to the invention, in the client/server type application, it is possible to perform the stop control of the session layer protocol through the service usage terminal, even when the function of the transport layer of the service usage terminal is the responder/device.

While preferred embodiments of the invention have been described and illustrated above, it should be understood that these are examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A service usage terminal which operates as a client in a client/server application in a higher layer than a transport layer in which a stop request of service provided by a server can be performed only by a client in the client and the server, the service usage terminal comprising:

a communication control section which operates as a slave in a master-slave transport layer protocol in which only a terminal operating as a master in the master and the slave can perform the stop control of service in a communication protocol in a higher layer than a transport layer protocol; and a manipulation section which inputs from a user the stop command of the service provided by a service providing terminal which operates as the server in the client/server application and operates as the master in the master-slave transport layer protocol, wherein the communication control section transmits a higher layer message representing the stop request of the service to the service providing terminal using communication data of a communication protocol in a higher layer than the transport layer when the stop command of the service is input, and stops the service in the communication protocol in a higher layer than the transport layer when a transport layer message representing the stop request of the service transmitted from the service providing terminal according to the higher layer message is received using communication data of the transport layer protocol.

2. The service usage terminal according to claim 1,
wherein the higher layer communication protocol is an OBEX protocol, and
wherein the communication control section transmits a "DISCONNECT" to which stop request information on the service is added as the higher layer message, or transmits an object indicating the stop request of the service using a "PUT".

3. The service usage terminal according to claim 1,
wherein the higher layer communication protocol is an SCSI protocol, and
wherein the communication control section transmits an SCSI command indicating the stop request of the service, as the higher layer message.

4. The service usage terminal according to claim 1,
wherein the higher layer communication protocol is a PTP protocol, and
wherein the communication control section transmits a "Service Stop" to which stop request information on the service is added, as the higher layer message, or transmits an object indicating the stop request of the service using a "Send Object".

5. The service usage terminal according to claim 1,
wherein the communication control section transmits the higher layer message relating to the stop request of the service, to the service providing terminal which operates as an initiator which functions as a master in the master-slave transport layer protocol.

6. A service providing terminal which operates as a server in a client/server application in a higher layer than a transport layer in which a stop request of service provided by a server can be performed only by a client in the client and the server, the service providing terminal comprising:
a communication control section which operates as a master in a master-slave transport layer protocol in which only a terminal operating as a master in the master and the slave can perform the stop control of service in a communication protocol in a higher layer than a transport layer protocol, and
transmits a transport layer message representing the stop request of the service to a service usage terminal using communication data of the transport layer protocol when a higher layer message representing the stop request of the service provided by the server is received using communication data of a communication protocol in a higher layer than the transport layer, from the service usage terminal which operates as the client in the client/server application and operates as the slave in the master-slave transport layer protocol.

7. The service providing terminal according to claim 6, wherein the higher layer communication protocol is an OBEX protocol, and
wherein the communication control section receives a "DISCONNECT" to which stop request information on the service is added as the higher layer message, or transmits an object indicating the stop request of the service using a "PUT".

8. The service providing terminal according to claim 6, wherein the higher layer communication protocol is an SCSI protocol, and
wherein the communication control section receives an SCSI command indicating the stop request of the service, as the higher layer message.

9. The service providing terminal according to claim 6, wherein the higher layer communication protocol is a PTP protocol, and
wherein the communication control section receives a "Service Stop" to which stop request information on the service is added, as the higher layer message, or receives an object indicating the stop request of the service using a "Send Object".

10. The service providing terminal according to claim 6, wherein the communication control section receives the higher layer message relating to the stop request of the service, from the service usage terminal which operates as a responder which functions as a slave in the master-slave transport layer protocol.

11. A method of controlling a service usage terminal which operates as a client in a client/server application in a higher layer than a transport layer in which a stop request of service provided by a server can be performed only by a client in the client and the server, the method comprising:
operating as a slave in a master-slave transport layer protocol in which only a terminal operating as a master in the master and the slave can perform the stop control of service in a communication protocol in a higher layer than a transport layer protocol; and
inputting from a user the stop command of the service provided by a service providing terminal which operates as the server in the client/server application and operates as the master in the master-slave transport layer protocol,
wherein the operating as a slave includes transmitting a higher layer message representing the stop request of the service to the service providing terminal using communication data of a communication protocol in a higher layer than the transport layer when the stop command of the service is input, and stopping the service in the communication protocol in a higher layer than the transport layer when a transport layer message representing the stop request of the service transmitted from the service providing terminal according to the higher layer message is received using communication data of the transport layer protocol.

12. A method of controlling a service providing terminal which operates as a server in a client/server application in a higher layer than a transport layer in which a stop request of service provided by a server can be performed only by a client in the client and the server, the method comprising:
operating as a master in a master-slave transport layer protocol in which only a terminal operating as a master in the master and the slave can perform the stop control of service in a communication protocol in a higher layer than a transport layer protocol, and
transmitting a transport layer message representing the stop request of the service to a service usage terminal using communication data of the transport layer protocol when a higher layer message representing the stop request of the service provided by the server is received using communication data of a communication protocol in a higher layer than the transport layer, from the service usage terminal which operates as the client in the client/server application and operates as the slave in the master-slave transport layer protocol.

13. A service providing system comprising:
a service usage terminal which operates as a client and a service providing terminal which operates as a server, in a client/server application in a higher layer than a transport layer in which a stop request of service provided by a server can be performed only by a client in the client and the server,
wherein the service usage terminal includes:
a first communication control section which operates as a slave in a master-slave transport layer protocol in which only a terminal operating as a master in the master and the slave can perform the stop control of service in a communication protocol in a higher layer than a transport layer protocol; and a manipulation section which inputs from a user the stop command of service provided by a service providing terminal which operates as the master in the master-slave transport layer protocol, wherein the first communication control section transmits a higher layer message representing the stop request of the service to the service providing terminal using communication data of a communication protocol in a higher layer than the transport layer when the stop command of the service is input, and stops the service in the communication protocol in a higher layer than the transport layer when a transport layer message representing the stop request of the service transmitted from the service providing terminal according to the higher layer message is received using communication data of the transport layer protocol, and wherein the service providing terminal includes a second communication control section which operates as a master in a master-slave transport layer protocol, and when the higher layer message is received using communication data of a communication protocol in a higher layer than the transport layer, from the service usage terminal which operates as the slave in the master-slave transport layer protocol, transmits the transport layer message to the service usage terminal using communication data of the transport layer protocol.

* * * * *